(12) United States Patent
Noguchi et al.

(10) Patent No.: US 8,599,693 B2
(45) Date of Patent: Dec. 3, 2013

(54) PACKET TRANSMISSION DEVICE AND PACKET TRANSMISSION METHOD

(75) Inventors: Tsutomu Noguchi, Fukuoka (JP); Katsumi Imamura, Fukuoka (JP); Hideyo Fukunaga, Fukuoka (JP); Yoko Ohta, Fukuoka (JP); Yoshito Kachita, Kawasaki (JP); Naoya Matsusue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 12/954,994

(22) Filed: Nov. 29, 2010

(65) Prior Publication Data

US 2011/0128847 A1    Jun. 2, 2011

(30) Foreign Application Priority Data

Nov. 30, 2009   (JP) ................................. 2009-271718
Oct. 29, 2010   (JP) ................................. 2010-244538

(51) Int. Cl.
*G01R 31/08*    (2006.01)

(52) U.S. Cl.
USPC ........................................................ 370/235

(58) Field of Classification Search
USPC ............ 370/394, 395.1, 395.41, 395.52, 909, 370/229, 263.1, 252, 230, 230.1, 234, 235, 370/389, 396, 412, 413
See application file for complete search history.

(56) References Cited

U.S. PATENT DOCUMENTS

| | | | |
|---|---|---|---|
| 6,661,803 B1 * | 12/2003 | Choi et al. ..................... | 370/413 |
| 6,801,500 B1 * | 10/2004 | Chandran .................. | 370/230.1 |
| 2002/0006111 A1 * | 1/2002 | Akita et al. ................... | 370/235 |
| 2004/0213276 A1 * | 10/2004 | Yamada ........................ | 370/412 |
| 2005/0259578 A1 * | 11/2005 | Shinagawa et al. ........... | 370/230 |
| 2006/0077904 A1 * | 4/2006 | Brandenburg et al. ....... | 370/252 |
| 2006/0268719 A1 * | 11/2006 | Takase et al. .............. | 370/235.1 |
| 2007/0223375 A1 * | 9/2007 | Ohta et al. .................... | 370/230 |
| 2009/0213734 A1 * | 8/2009 | Hashinaga et al. ........... | 370/235 |
| 2009/0252035 A1 * | 10/2009 | Fukunaga et al. ......... | 370/230.1 |

FOREIGN PATENT DOCUMENTS

| | | |
|---|---|---|
| JP | 9-8812 A | 1/1997 |
| JP | 9-200214 A | 7/1997 |
| JP | 9-224036 A | 8/1997 |
| JP | 9-224038 A | 8/1997 |

* cited by examiner

*Primary Examiner* — Anh-Vu Ly
*Assistant Examiner* — Gustavo Lopez-Vargas
(74) *Attorney, Agent, or Firm* — Fujitsu Patent Center

(57) ABSTRACT

The packet transmission device including: a first and a second storage module to store a token value; a token controller to add a predetermined token value to a first total token value, and subtract a predetermined token value from the first total value in response to the output of the packet; an overrun state controller to add an excess of the first total token value over a predetermined upper limit value to a second total token value, in the case where the first total token value added by addition control is greater than or equal to the predetermined upper limit value; and an underrun state controller to subtract a predetermined token value from the second total token value and add the subtracted token value to the first total token value, in the case where the subtracted first total token value is less than the predetermined upper limit value.

7 Claims, 22 Drawing Sheets

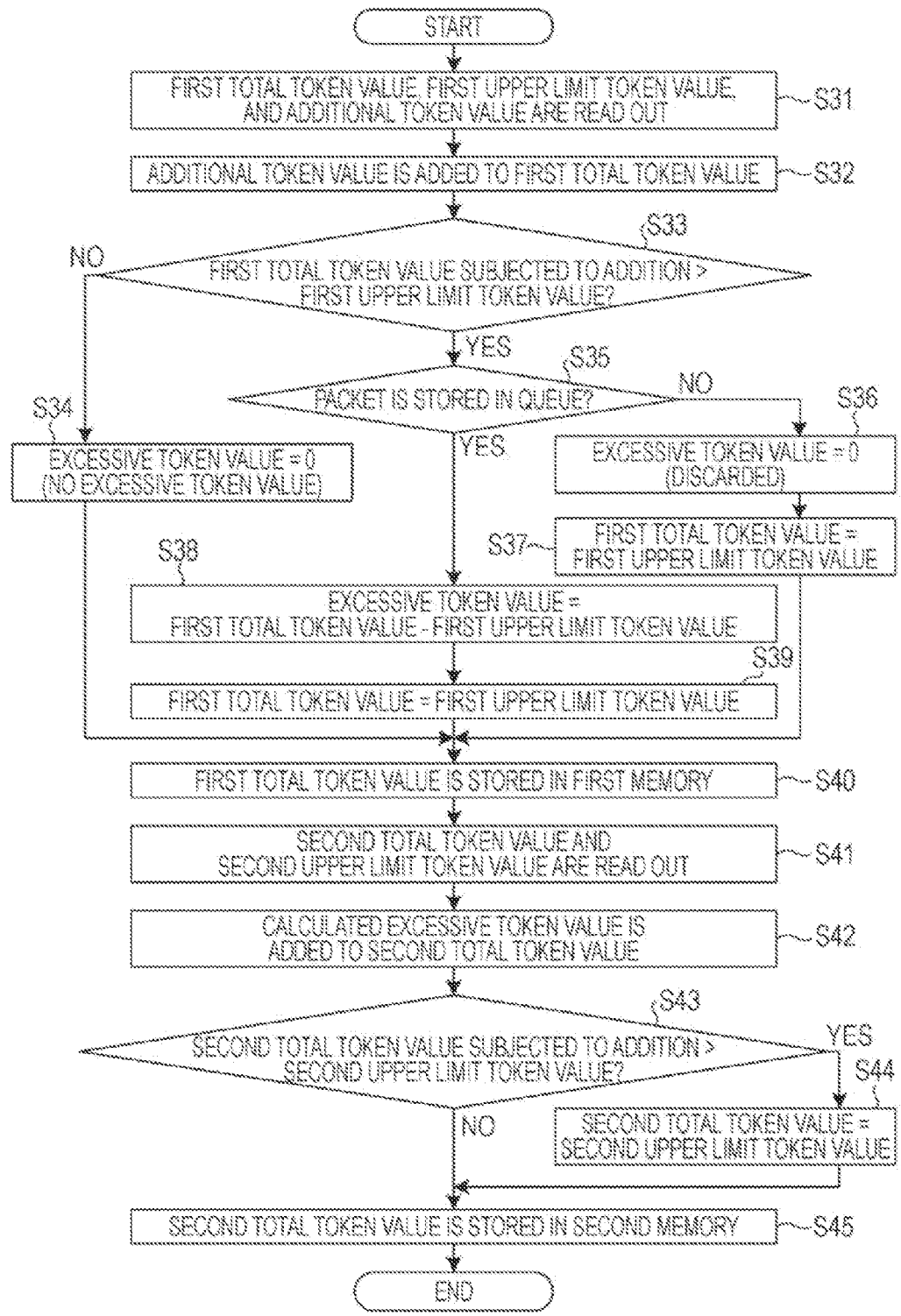

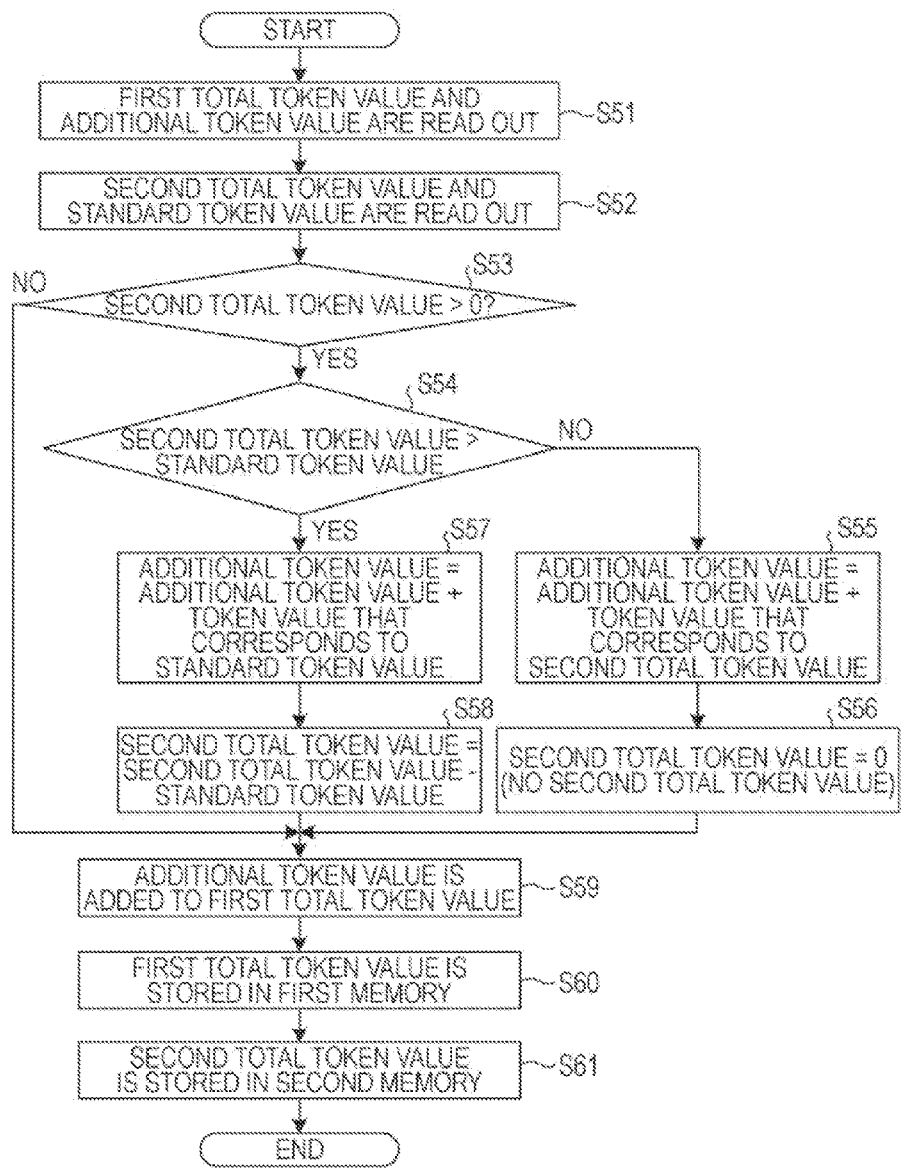

FIG. 10A RELATED ART

| TIME (ns) | 0 | 100 | 200 | 300 | 400 | 500 | 600 | 700 | 710 | 720 | 730 |
|---|---|---|---|---|---|---|---|---|---|---|---|
| TOTAL TOKEN VALUE (bits) | 0 | 1000 | 2000 | 3000 | 4000 | 5000 | 5000 | 5000 | 4200 | 3400 | 2600 |
| OUTPUT PACKET AMOUNT (bits) | 0 | 0 | 0 | 0 | 0 | 0 | 0 | 0 | 800 | 1600 | 2400 |

| TIME (ns) | 740 | 750 | 760 | 770 | 800 | — | — | — | 1000 | — | 1100 |
|---|---|---|---|---|---|---|---|---|---|---|---|
| TOTAL TOKEN VALUE (bits) | 1800 | 1000 | 200 | -600 | -400 | — | — | — | 0 | — | 200 |
| OUTPUT PACKET AMOUNT (bits) | 3200 | 4000 | 4800 | 5600 | 6400 | — | — | — | 8000 | — | 8800 |

FIG. 10B EMBODIMENT

| TIME (ns) | 0 | 100 | 200 | 300 | 400 | 500 | 600 | 700 | 710 | 720 | 730 |
|---|---|---|---|---|---|---|---|---|---|---|---|
| FIRST TOTAL TOKEN VALUE (bits) | 0 | 1000 | 2000 | 3000 | 4000 | 5000 | 5000 | 5000 | 4200 | 3400 | 2600 |
| SECOND TOTAL TOKEN VALUE (bits) | 0 | 0 | 0 | 0 | 0 | 0 | 0 | 0 | 2000 | 2000 | 2000 |
| OUTPUT PACKET AMOUNT (bits) | 0 | 0 | 0 | 0 | 0 | 0 | 0 | 0 | 800 | 1600 | 2400 |

| TIME (ns) | 740 | 750 | 760 | 770 | 800 | 810 | 900 | 1000 | 1010 | 1100 |
|---|---|---|---|---|---|---|---|---|---|---|
| FIRST TOTAL TOKEN VALUE (bits) | 1800 | 1000 | 200 | -600 | 100 | -700 | 0 | 700 | -100 | 600 |
| SECOND TOTAL TOKEN VALUE (bits) | 2000 | 2000 | 2000 | 2000 | 1500 | 1500 | 1000 | 500 | 500 | 0 |
| OUTPUT PACKET AMOUNT (bits) | 3200 | 4000 | 4800 | 5600 | 6400 | 7200 | 8000 | 8800 | 9600 | 10400 |

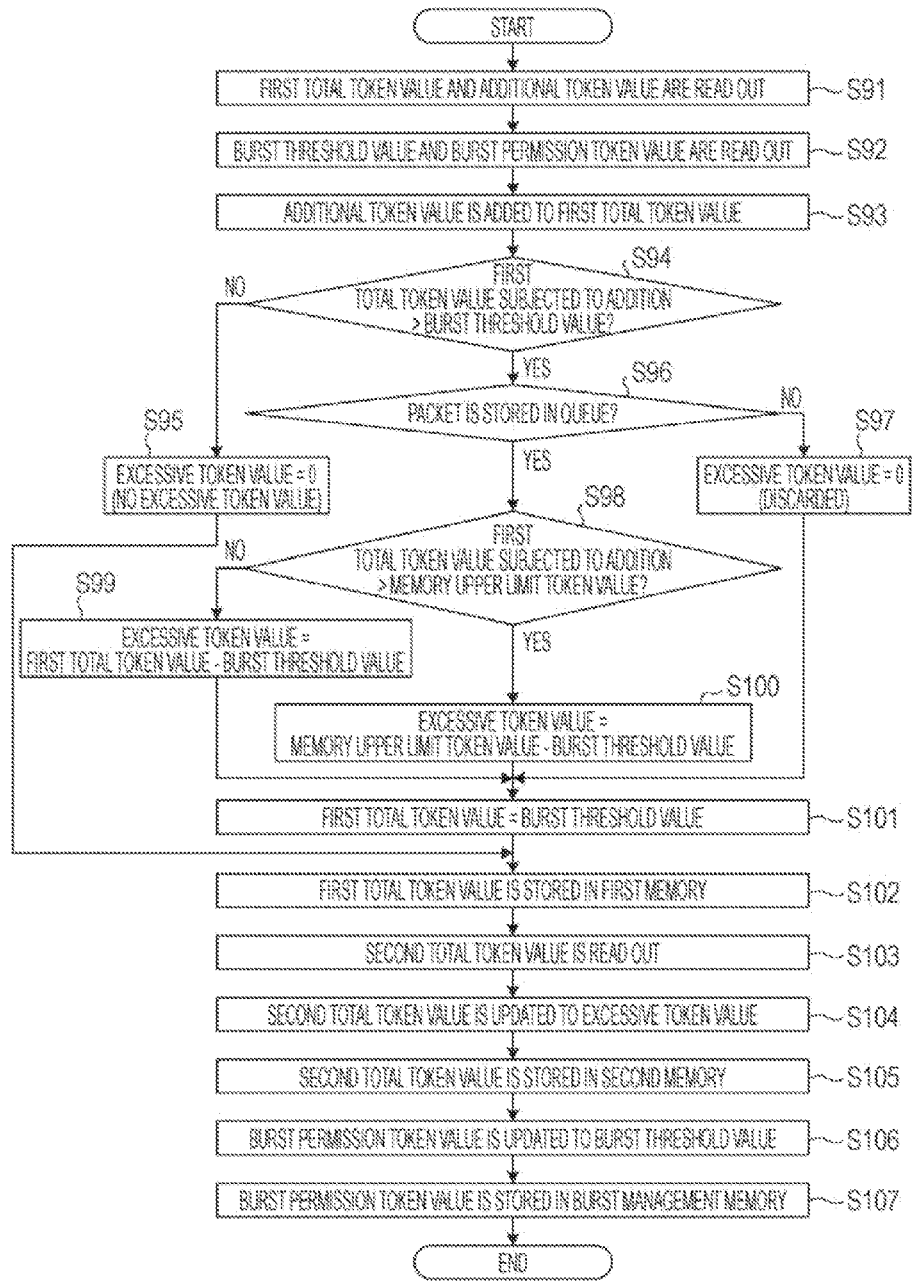

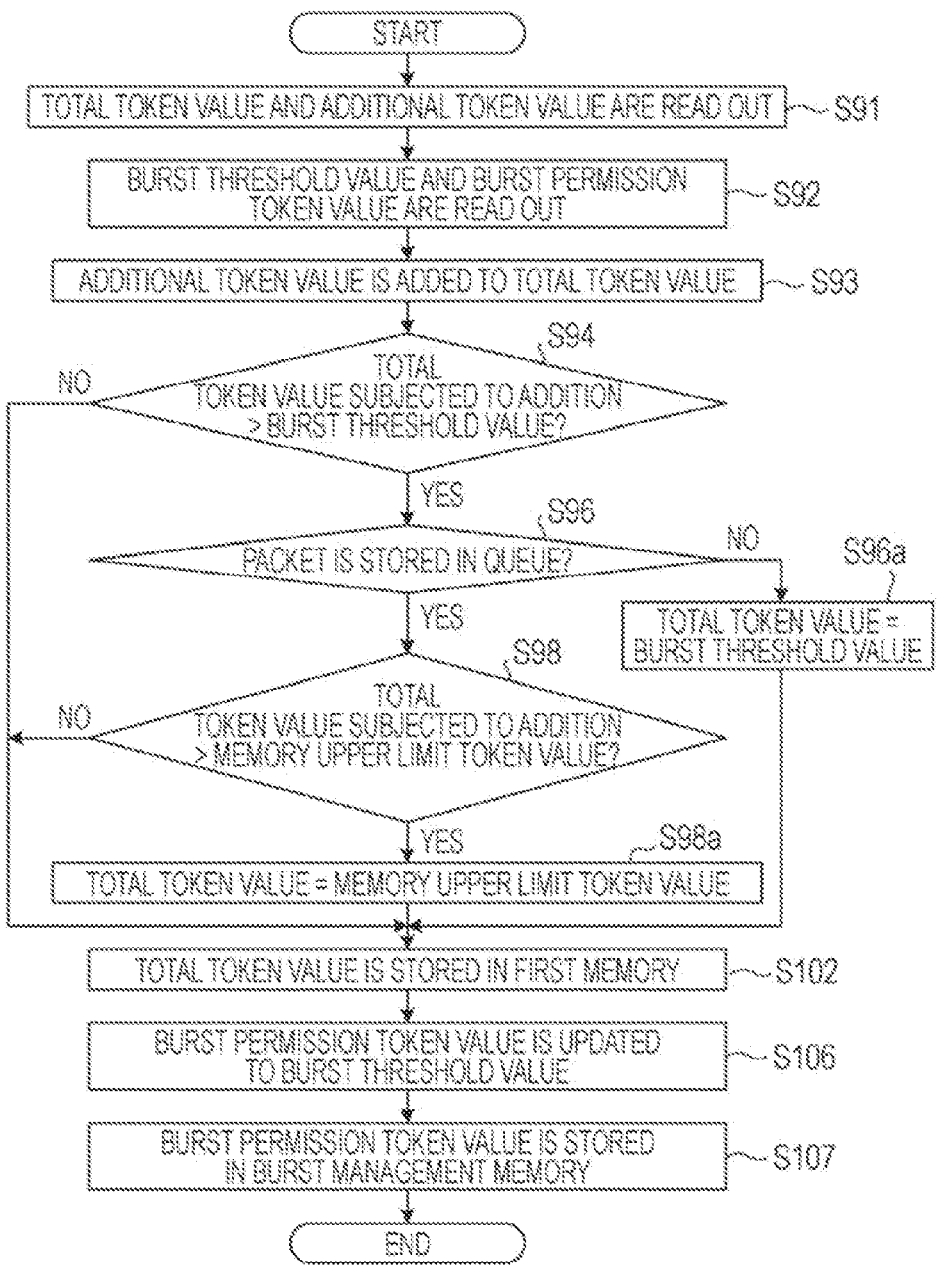

FIG. 16
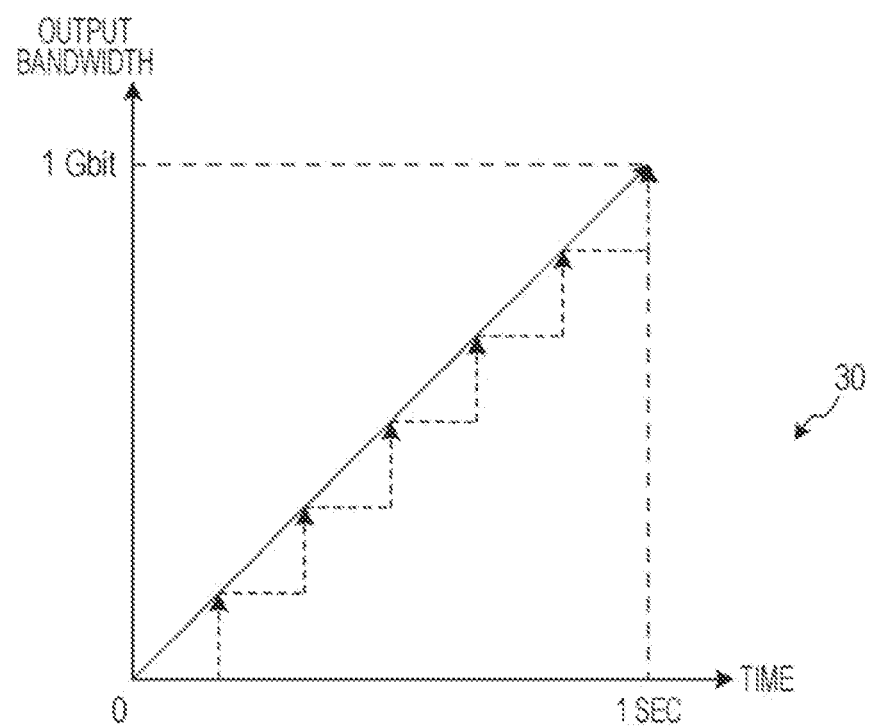
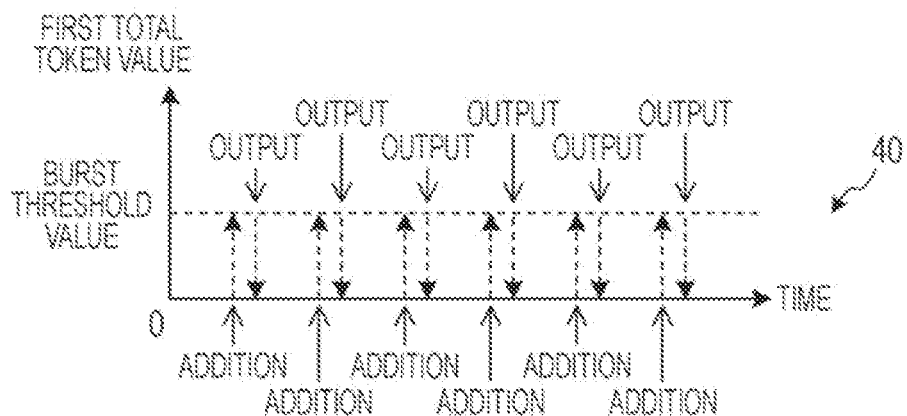

RELATED ART  FIG. 20

RELATED ART
FIG. 21
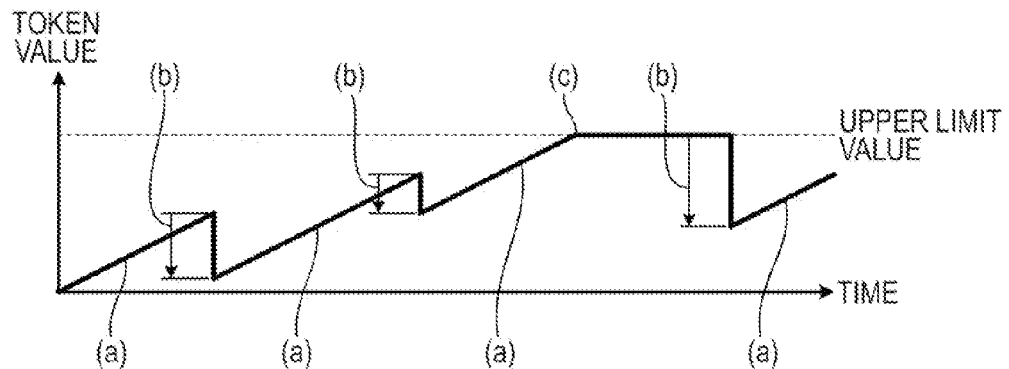
RELATED ART
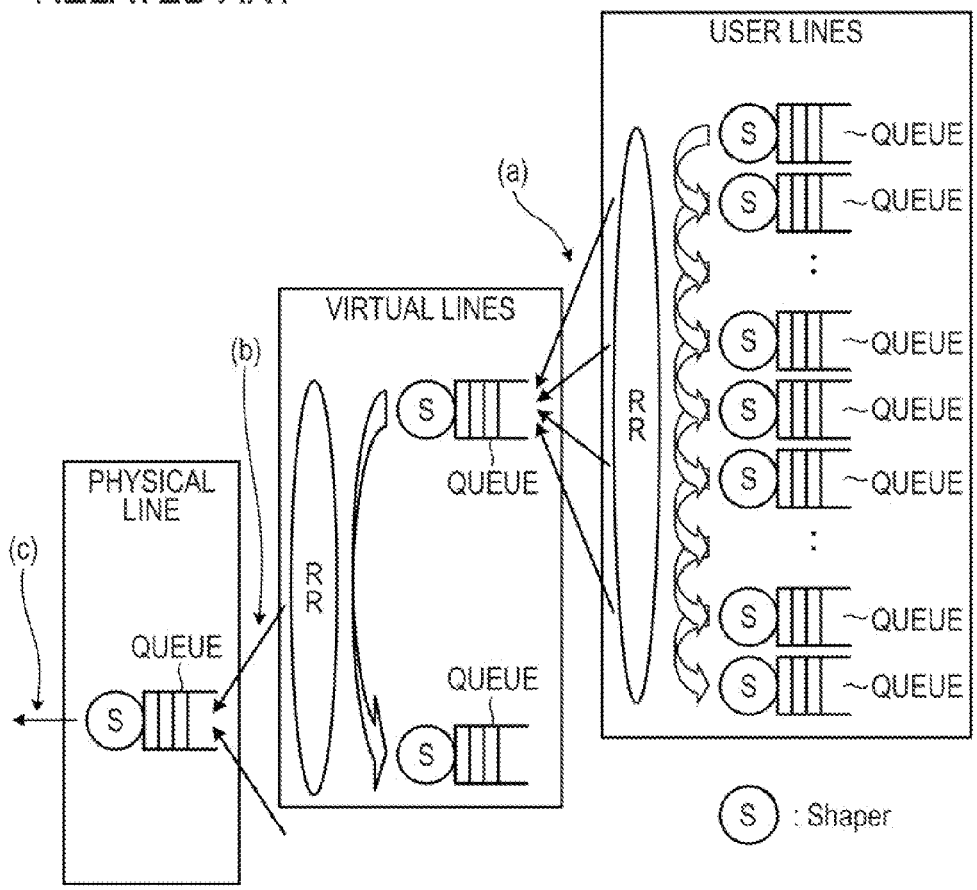

PACKET TRANSMISSION DEVICE AND PACKET TRANSMISSION METHOD

CROSS-REFERENCE TO RELATED APPLICATIONS

This application is based upon and claims the benefit of priority of the prior Japanese Patent Application No. 2009-271718, filed on Nov. 30, 2009, and the Japanese Patent Application No. 2010-244538, fined on Oct. 29, 2010, the entire contents of which are incorporated herein by reference.

FIELD

The embodiments discussed herein are related to a packet transmission device and a packet transmission method.

BACKGROUND

On an IP network, packets are flowing from various types of transmission sources to various types of destinations. At a point where the flows of the packets (referred to as "flows" hereinafter) meet, a packet transmission device for controlling the traffic of the flows is disposed. The packet transmission device includes a multistage structure for containing lines in which a plurality of flows are aggregated.

FIG. 20 is a diagram for explaining an example in which lines are contained in a packet transmission device. As illustrated in FIG. 20, the packet transmission device contains user lines, virtual lines, and a physical line. The user lines are lines in which flows that individual users use are aggregated, the virtual lines are lines in which the user lines are aggregated in units of groups such as companies to which the users belong, and the physical line is a line in which the virtual lines are aggregated into a fiber cable that connects one group such as a company or the like to another.

The packet transmission device that includes the multistage structure for containing a plurality of lines in this way typically controls the output rate (referred to as "bandwidth" hereinafter) of packets output from individual lines. As a method for controlling the bandwidth, a token control technique in which a token value that is information used for determining whether or not the output of a packet is permitted is used is widely utilized.

FIG. 21 is a diagram for explaining an example of a token control operation. In addition, in FIG. 21, a horizontal axis indicates a time, and a vertical axis indicates a token value stored in a predetermined memory. A packet transmission device that performs a token control operation adds a predetermined token value with a predetermined period to a total token value that indicates the sum of token values (refer to (a) in FIG. 21). In addition, the packet transmission device subtracts a token value, which corresponds to an output packet, from the total token value in the memory in response to the output of the packet (refer to (b) in FIG. 21). In addition, when, at the time of adding of the predetermined token value to the total token value in the memory, the total token value subjected to the adding exceeds a predetermined upper limit value, the packet transmission device discards the excess of the total token value over the predetermined upper limit value (refer to (c) in FIG. 21). While repeating such an operation, the packet transmission device outputs the packets from the individual lines in response to the total token values in the memory, and hence controls the bandwidths.

In addition, when there are a plurality of queues, in which packets are stored, in each line, the packet transmission device sequentially selects a queue in accordance with a round robin (RR) method, and sequentially output a packet from the selected queue. In addition, the RR method is a method of the related art, which is used for selecting an object in order.

FIG. 22 is a diagram for explaining the output of a packet, which uses the RR method. In addition, the packet transmission device illustrated in FIG. 22 contains the user line, the virtual line, and the physical line, and includes a plurality of queues, in which packets are stored, in each line. In addition, the packet transmission device illustrated in FIG. 22 includes a shaper function used for controlling the bandwidth using the token control.

The packet transmission device sequentially selects, in the user line, a queue from among a plurality of queues from which packets can be output owing to the shaper function, and outputs a packet from the selected queue to the virtual line (refer to (a) in FIG. 22). In addition, the packet transmission device sequentially selects, in the virtual line, a queue from among a plurality of queues from which packets can be output owing to the shaper function, and outputs a packet from the selected queue to the physical line (refer to (b) in FIG. 22). In addition, the packet transmission device outputs a packet, received from the virtual line, to another device (refer to (c) in FIG. 22).

Examples of the related art include Japanese Laid-open Patent Publication Nos. 9-224036, 9-224038, 9-200214, and 9-8812.

SUMMARY

According to an aspect of the embodiment, there is provided a packet transmission device, the packet transmission device including a first storage module and a second storage module configured to store a token value being information used to control an output of a packet, a token controller configured to add a predetermined token value with a predetermined period to a first total token value indicating a sum of token values stored in the first storage module, and subtract a predetermined token value from the first total value in response to the output of the packet, an overrun state controller configured to add an excess of the first total token value over a predetermined upper limit value to a second total token value indicating a sum of token values stored in the second storage module, in the case where the first total token value added by addition control of the token controller is greater than or equal to the predetermined upper limit value, and an underrun state controller configured to subtract a predetermined token value from the second total token value and add the subtracted token value to the first total token value, in the case where the first total token value subtracted by subtraction control of the token controller is less than the predetermined upper limit value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a flowchart illustrating a processing procedure of an overrun state control processing operation performed in the bandwidth controller according to the second embodiment;

FIG. 9 is a flowchart illustrating a processing procedure of an underrun state control processing operation performed in the bandwidth controller according to the second embodiment;

FIGS. 10A and 10B are diagrams for explaining an advantageous effect of the packet transmission device according to the second embodiment;

FIG. 15A is a flowchart illustrating a processing procedure of an overrun state control processing operation performed in a bandwidth controller in the third embodiment;

FIG. 15B is a flowchart illustrating a processing procedure of an overrun state control processing operation performed when a packet transmission device exchanges a token value within a total token value;

FIG. 16 is a diagram illustrating an output history of packets when a burst threshold value is equal to an additional token value;

FIG. 21 is a diagram for explaining an example of token control;

FIG. 22 is a diagram for explaining output of packets using an RR method;

DESCRIPTION OF EMBODIMENTS

Figure 23:
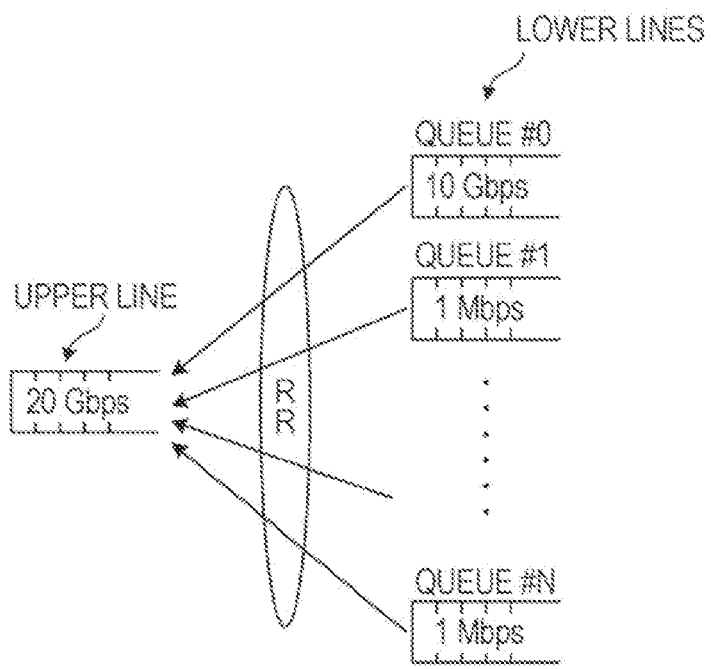
FIG. 23 is a diagram for explaining an example that occurs in a packet transmission device.
Figure 24:
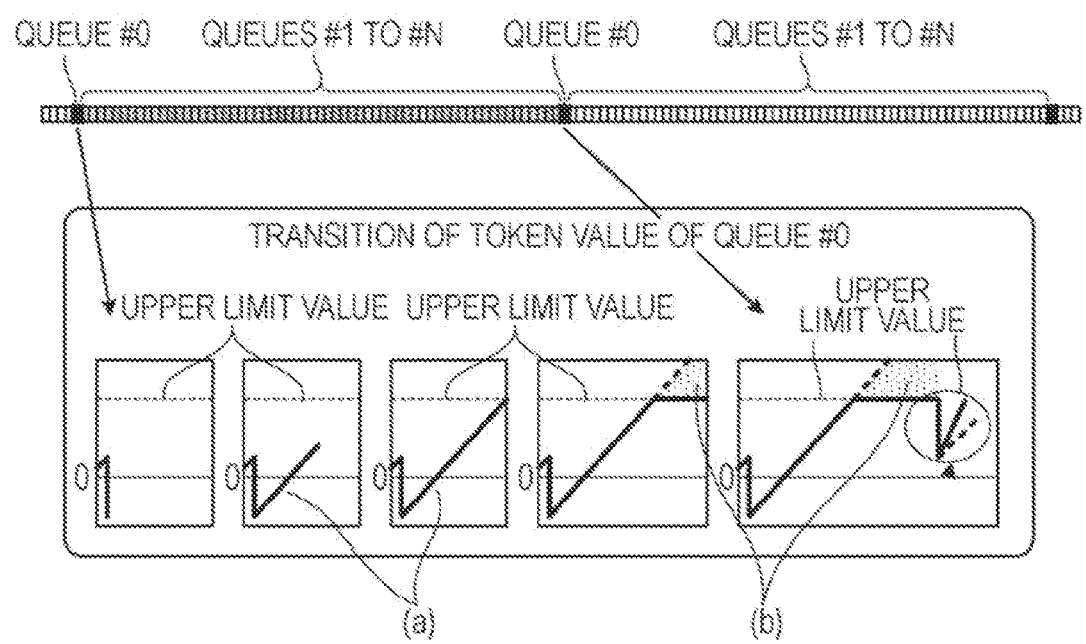
FIG. 24 is a diagram for explaining an example that occurs in a packet transmission device.

A phenomenon that, when the total token value exceeds the predetermined upper limit value, the bandwidth decreases will be described with reference to FIGS. 23 and 24. FIGS. 23 and 24 are diagrams for explaining an example of a packet transmission device.

As illustrated in FIG. 23, when there are a plurality of queues #0 to #N, from which packets may be output, the packet transmission device sequentially selects a queue using the RR method, and sequentially outputs a packet from the selected queue to an upper line. In addition, the upper line illustrated in FIG. 23 is, for example, a physical line or a virtual line, which may be assumed to have the bandwidth of up to 20 Gbps. In addition, a lower line illustrated in FIG. 23 is, for example, a virtual line or a user line, which may be assumed to include a queue #0 that has the bandwidth of 10 Gbps and queues #1 to #N that have the bandwidths of 1 Mbps.

In such a condition, as illustrated in FIG. 24, the packet transmission device halts the output of packets from the queue #0, for example, during a period from once packets have been output from the queue #0 to when the output of packets from other queues #1 to #N is completed. In addition, a diagram illustrated in an upper side of FIG. 24 indicates a condition in which the queues #0 to #N are arranged through time in the order selected in accordance with the RR method. In addition, a diagram illustrated in a lower side of FIG. 24 indicates a history in which the transition of a total token value in a memory with respect to the queue #0 is expressed on a time axis.

In addition, during the period when the output of packets from the queue #0 is halted, the packet transmission device adds a token value to the total token value in the memory with a predetermined period (refer to (a) in FIG. 24). On the other hand, since the output of packets from the queue #0 is not performed, a token value is not subtracted from the total token value in the memory. Therefore, the total token value subjected to the addition of the token value exceeds a predetermined upper limit value, and the packet transmission device discards the excess of the total token value over the predetermined upper limit value (refer to (b) in FIG. 24). As a result, packets that correspond to the discarded token value are not output, and hence the bandwidth decreases.

In addition, in order to suppress such a decrease of the bandwidth, a configuration in which the upper limit value of the memory is increased and a greater token value can be held in the memory may be adopted. However, in such a configuration, the amount of packets that can be output at a time increases. As a result, the overflow of packets may occur in a facing device that receives the output packets, and hence the discard (burst) of packets may occur in the facing device.

Embodiments of a packet transmission device and a packet transmission method will be described with reference to figures in detail, hereinafter. In addition, in the following embodiments, a case in which the packet transmission device and the packet transmission method are applied to a packet transmission device such as a router, a switch, or the like will be described.

First Embodiment

The configuration of a packet transmission device according to a first embodiment will be described. A packet transmission device 10 according to the first embodiment controls the output of packets in accordance with a control method (referred to as "token control") in which a token value that is information used for determining whether or not the output of a packet is permitted is used. For example, a packet transmission device that includes a shaper function used for controlling the output rate of packets (referred to as "bandwidth" hereinafter) corresponds to the packet transmission device 10.

Figure 1:
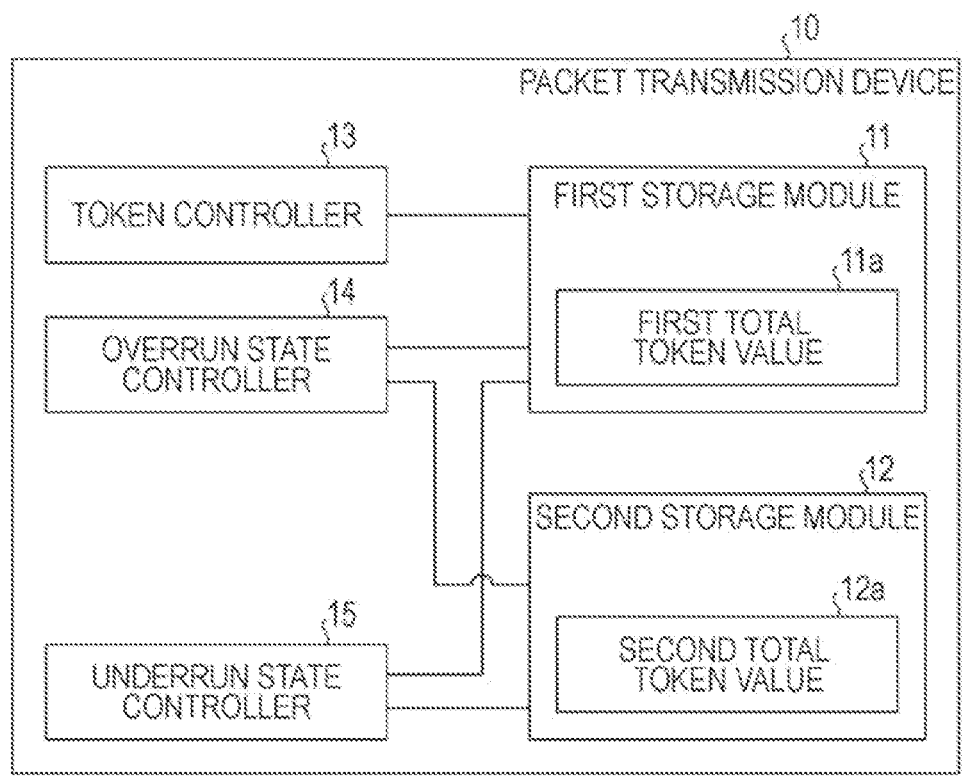
FIG. 1 is a block diagram illustrating a configuration of a packet transmission device according to a first embodiment.

FIG. 1 is a block diagram illustrating a configuration of the packet transmission device 10 according to the first embodiment. As illustrated in FIG. 1, the packet transmission device 10 includes a first storage module 11, a second storage module 12, a token controller 13, an overrun state controller 14, and an underrun state controller 15. The first storage module 11 and the second storage module 12 store token values used for the output control of packets. In addition, hereinafter, the sum of token values stored in the first storage module 11 is called "first total token value", and the sum of token values stored in the second storage module 12 is called "second total token value". In addition, as the second storage module 12, any storage device that can store the token value therein, such as a memory or the like that stores the token value therein, may be used.

The token controller 13 adds a predetermined token value to a first total token value 11a with a predetermined period. In addition, the token controller 13 subtracts a predetermined token value from the first total token value 11a in response to the output of a packet.

When the token controller 13 adds a token value, the overrun state controller 14 determines whether or not the first total token value 11a subjected to the addition exceeds a predetermined upper limit value. In addition, when the first total token value 11a subjected to the addition exceeds the predetermined upper limit value, the overrun state controller 14 adds the excess of the first total token value over the predetermined upper limit value to a second total token value 12a. On the other hand, when the first total token value 11a subjected to the addition does not exceed the predetermined upper limit value, the overrun state controller 14 maintains the current second total token value 12a.

When the first total token value 11a falls below the predetermined upper limit value owing to the subtraction of the token value, performed by the token controller 13 in response to the output of a packet, the underrun state controller 15 subtracts a predetermined token value from the second total token value 12a. In addition, the underrun state controller 15 adds the subtracted token value to the first total token value 11a.

Figure 2:
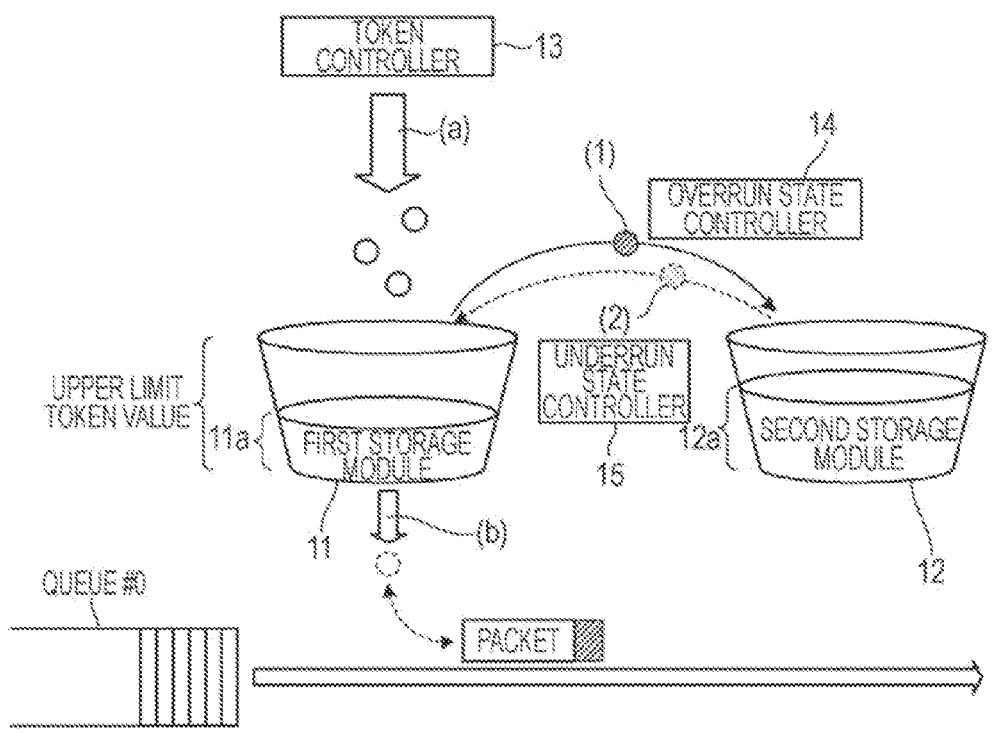
FIG. 2 is a diagram for explaining an example of a processing operation performed in the packet transmission device according to the first embodiment.
Figure 3:
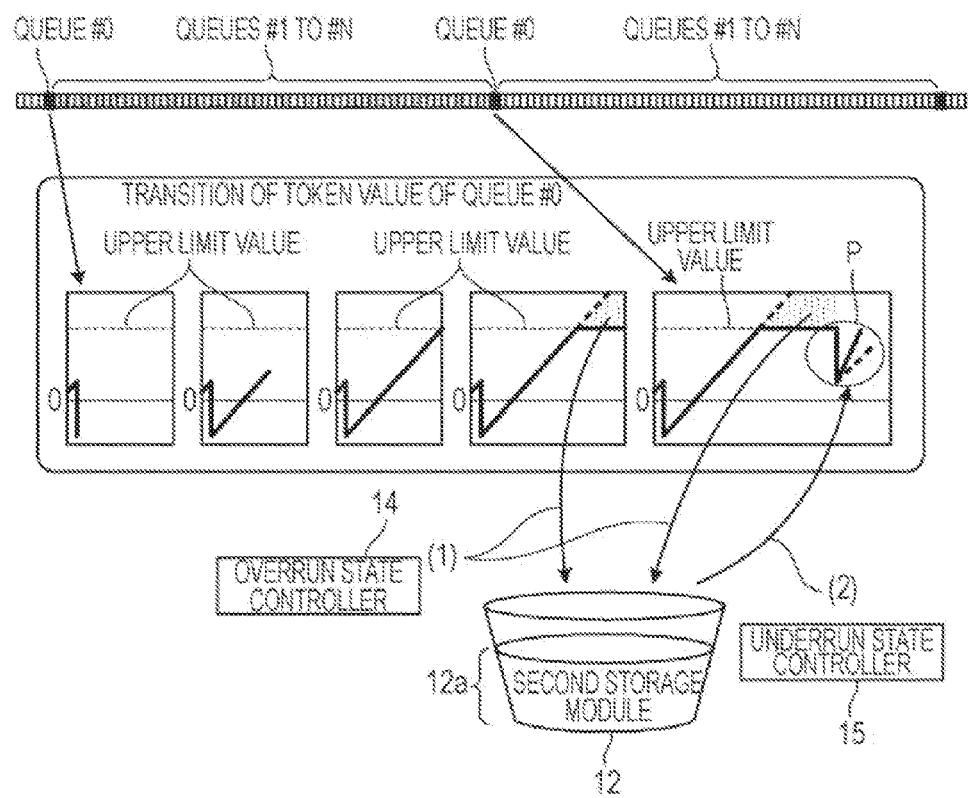
FIG. 3 is a diagram for explaining an example of a processing operation performed in the packet transmission device according to the first embodiment.
Figure 4:
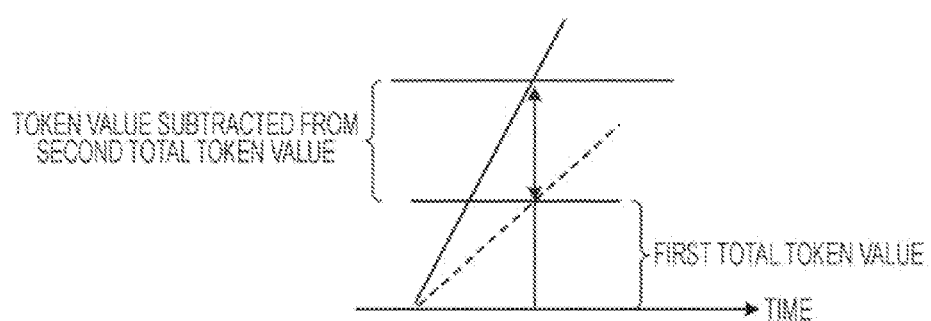
FIG. 4 is a diagram illustrating a magnified view of a P portion in FIG. 3.

Next, the packet transmission device 10 will be explained by citing an example. FIGS. 2 and 3 are diagrams illustrating the configuration of the packet transmission device 10, and FIG. 4 is a diagram illustrating the magnified view of a P portion in FIG. 3. In addition, in FIGS. 2 to 4, an example in which the packet transmission device 10 controls the bandwidth of a queue #0 from among a plurality of queues #0 to #N, using the token control will be described. In addition, a diagram illustrated in an upper side of FIG. 3 indicates a condition in which the queues #0 to #N are arranged through time in the order selected in accordance with a round robin (RR) method. In addition, the RR method is a method of the related art, which is used for selecting an object in order.

In addition, a diagram illustrated in a lower side of FIG. 3 indicates a history in which the transition of the first total token value in the first storage module 11 with respect to the queue #0 is expressed on a time axis, and indicates a condition in which a time elapses from the left side of FIG. 3 to the right side of FIG. 3.

The packet transmission device 10 controls the bandwidth of the queue #0 using the token control. Namely, the token controller 13 adds the predetermined token value to the first total token value 11a with the predetermined period (refer to (a) in FIG. 2). In addition, the token controller 13 subtracts a token value, which corresponds to, for example, the packet length of an output packet, from the first total token value 11a in response to the output of the packet from the queue #0 (refer to (b) in FIG. 2).

While executing such a bandwidth control operation, the packet transmission device 10 executes a processing operation for suppressing the decrease of the bandwidth. When the first total token value 11a subjected to the addition of the token value by the token controller 13 exceeds the predetermined upper limit value, the overrun state controller 14 adds the excess of the first total token value over the predetermined upper limit value to the second total token value 12a in the second storage module 12 (refer to (1) in FIG. 2 and (1) in FIG. 3).

In addition, when the first total token value 11a falls below the predetermined upper limit value owing to the subtraction of the token value by the token controller 13, the underrun state controller 15 subtracts the predetermined token value from the second total token value 12a. In addition, the underrun state controller 15 adds the subtracted token value to the first total token value 11a (refer to (2) in FIG. 2 and (2) in FIG. 3).

Accordingly, as illustrated in FIG. 4, the first total token value 11a instantaneously increases by the amount of a token value added from the second total token value 12a. In addition, a dotted line illustrated in FIG. 4 indicates the transition of the first total token value 11a in a case in which it is assumed that the predetermined token value is added to the first total token value 11a with the predetermined period, using normal token control. In addition, a solid line illustrated in FIG. 4 indicates the transition of the first total token value 11a in a case in which a token value, subtracted from the second total token value 12a by the underrun state controller 15, is added to the first total token value 11a.

In this way, the packet transmission device 10 stores a token value, which overflows from the first storage module 11 owing to the token control, in the second storage module 12, and adds a token value in the second storage module 12 to the first storage module 11 when a token value is consumed from the first storage module 11 in response to the output of a packet. Therefore, the packet transmission device 10 can more quickly increase the first total token value in the first storage module 11 than a method of the related art, in which a predetermined token value is added with a predetermined period, using the normal token control. This means that, when the packet transmission device 10 sequentially selects a queue, using, for example, the RR method, the first total token value 11a that is greater can be held in the first storage module 11 that corresponds to the selected queue. Accordingly, the packet transmission device 10 can more quickly output a packet in response to the first total token value in the first storage module 11. As a result, the packet transmission device 10 can suppress the decrease of the bandwidth, compared with a method of the related art, in which all the excess of a token value over the upper limit value of a memory is discarded.

In addition, while the packet transmission device 10 outputs a packet in response to the first total token value in the first storage module 11, the packet transmission device 10 does not increase the upper limit value of the first storage module 11. Therefore, the packet transmission device 10 can prevent a burst in a facing device from occurring.

Second Embodiment

Figure 5:
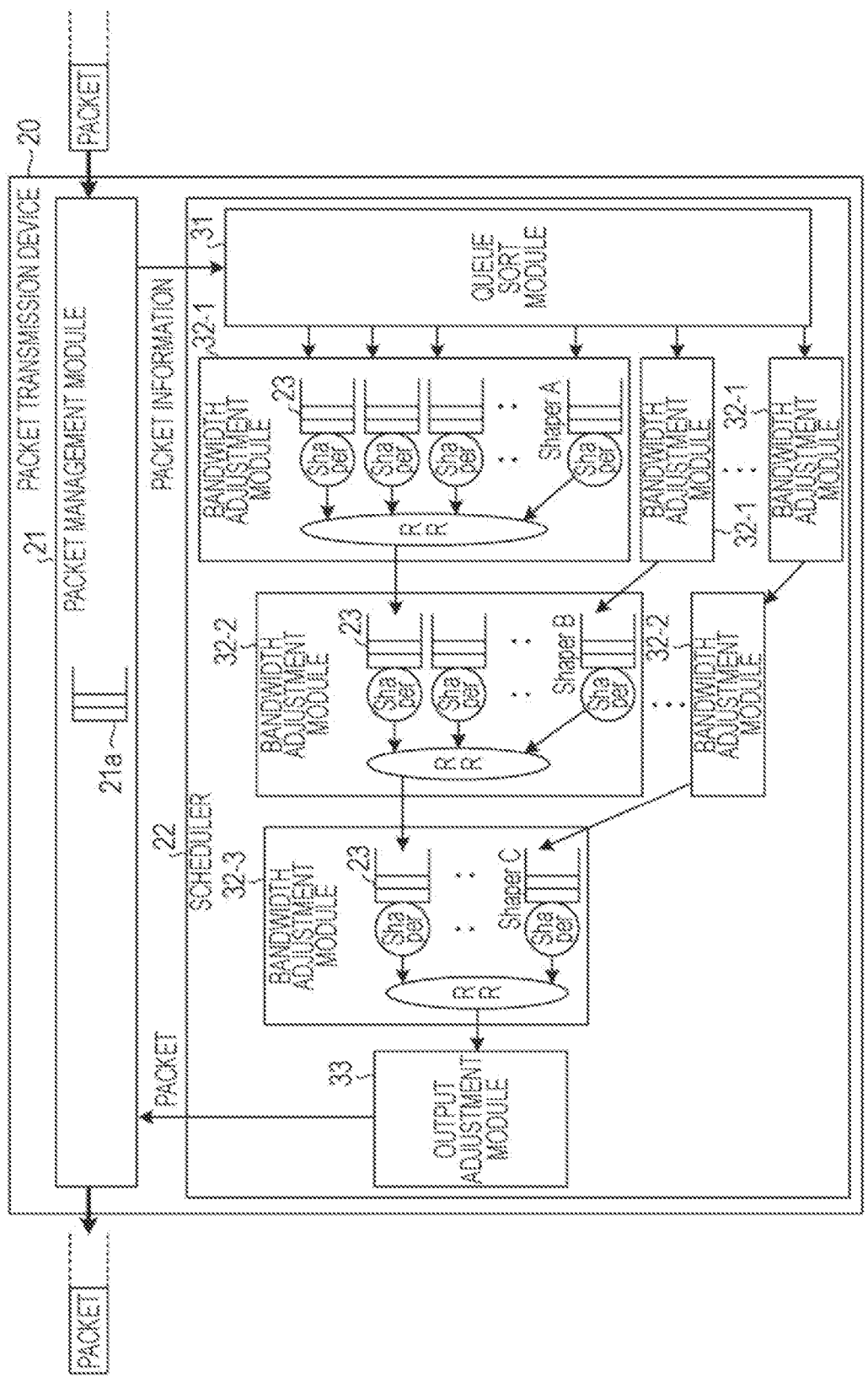
FIG. 5 is a block diagram illustrating a configuration of a packet transmission device according to a second embodiment.

Next, the configuration of a packet transmission device according to a second embodiment will be described. FIG. 5 is a block diagram illustrating the configuration of a packet transmission device 20 according to the second embodiment. As illustrated in FIG. 5, the packet transmission device 20 includes a packet management module 21 and a scheduler 22.

The packet management module 21 manages a packet received from another device. Specifically, when the packet management module 21 receives the packet from another device, the packet management module 21 holds the received packet in a shared memory 21a. In addition, the packet management module 21 transmits packet information to a queue sort module 31 in the scheduler 22, which will be describe later, the packet information being information that associates individual memory regions, included in the shared memory 21a, with packets stored in the memory regions. In addition, when the packet management module 21 receives a packet from an output adjustment module 33 in the scheduler 22, which will be describe later, the packet management module 21 outputs the received packet.

The scheduler 22 includes a plurality of queues 23 that temporarily store packets, performs the token control using the packet information received from the packet management module 21, and adjusts the bandwidths of packets output from the queues 23 on the basis of the token control. Specifically, the scheduler 22 includes the queue sort module 31 and bandwidth adjustment modules 32-1 to 32-3 that are three-layered.

In addition, the scheduler 22 illustrated in FIG. 5 will be described on the basis of an assumption that the scheduler 22 includes a three-layered bandwidth adjustment module that includes the bandwidth adjustment modules 32-1 used for user lines, the bandwidth adjustment modules 32-2 used for virtual lines, and the bandwidth adjustment module 32-3 used for a physical line. However, the scheduler 22 may include a bandwidth adjustment module that is one or two-layered, a bandwidth adjustment module that is more than three-layered, or a bandwidth adjustment module that is arbitrarily layered. In addition, when it is not necessary to separately refer to the three bandwidth adjustment modules 32-1 to 32-3 as "bandwidth adjustment modules 32-1 to 32-3", respectively, each of the bandwidth adjustment modules 32-1 to 32-3 is simply called "bandwidth adjustment module 32".

When the queue sort module 31 receives the packet information from the packet management module 21, the queue sort module 31 reads out a corresponding packet from the memory region in the shared memory 21a, indicated by the packet information, and sorts the read out packet into the queues 23 to store the packet. The bandwidth adjustment module 32 adjusts the bandwidths of packets to be output from the queues 23 by executing the token control, and outputs the packets, the bandwidths of which are adjusted, to the output adjustment module 33. In addition, the specific configuration of the bandwidth adjustment module 32 will be described later.

The output adjustment module 33 performs a timing adjustment operation so that packets output from the bandwidth adjustment module 32-3, used for the physical line, that is the highest bandwidth adjustment module among the bandwidth adjustment modules 32, do not compete against one another, and, upon receiving packets from the bandwidth adjustment modules 32, the output adjustment module 33 transmits the received packets to the packet management module 21.

Figure 6:
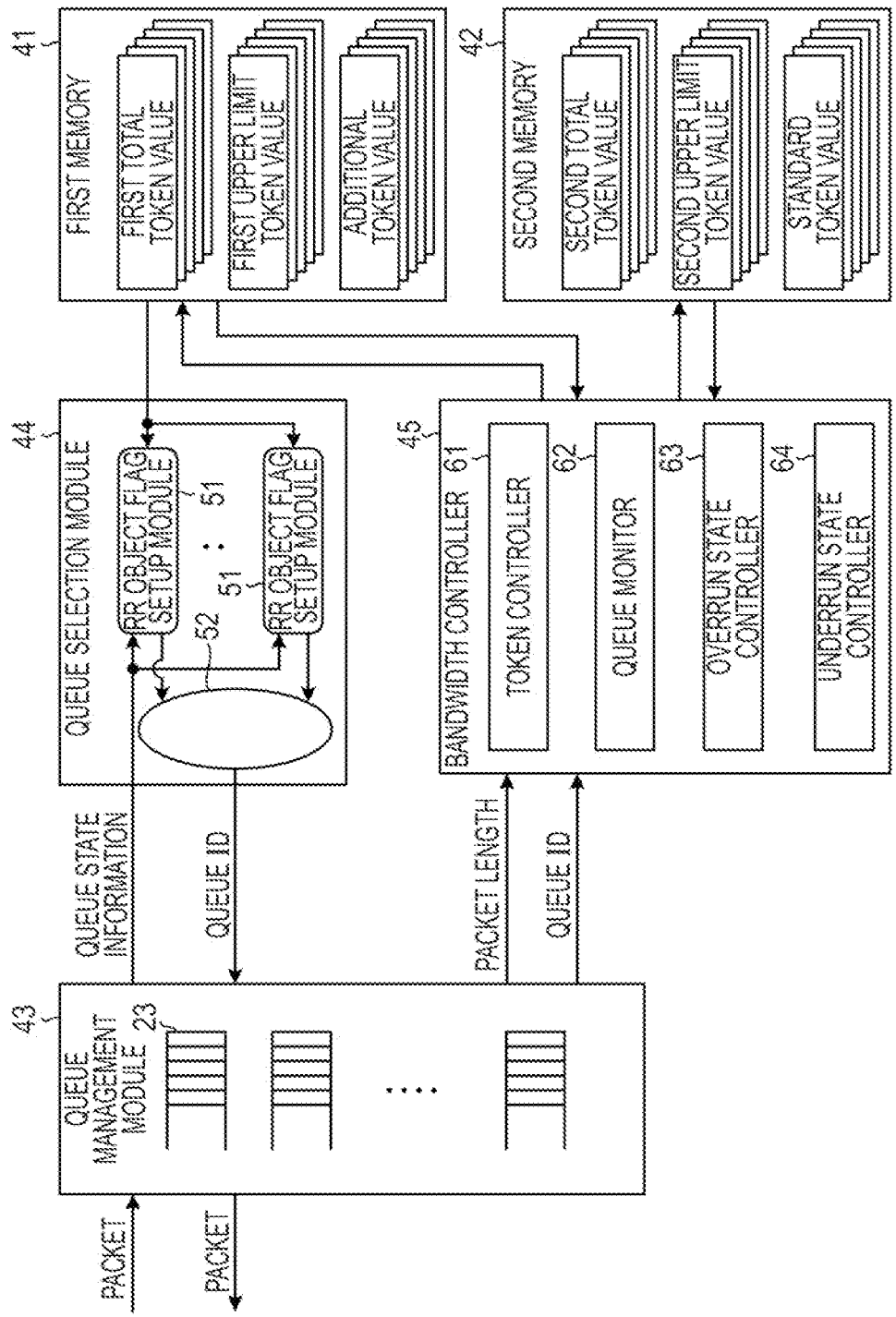
FIG. 6 is a block diagram illustrating a configuration of a bandwidth adjustment module illustrated in FIG. 5.

Here, the specific configuration of the bandwidth adjustment module 32 will be described. FIG. 6 is a block diagram illustrating the configuration of the bandwidth adjustment module 32 illustrated in FIG. 5. The bandwidth adjustment module 32 adjusts the bandwidths of packets to be output from the queues 23 by executing the token control. Specifically, as illustrated in FIG. 6, the bandwidth adjustment module 32 includes a first memory 41, a second memory 42, a queue management module 43, a queue selection module 44, and a bandwidth controller 45.

The first memory 41 stores token values. Specifically, a first total token value, a first upper limit token value, and an additional token value are associated with each queue 23, and these token values are stored in the first memory 41. The first total token value indicates the sum of token values that are assigned to individual queues 23 and currently stored in the first memory 41. The first upper limit token value indicates the upper limit value of the first total token value in the first memory 41. The additional token value indicates a token value that is assigned to each queue 23 and is to be added to the first memory 41 at a time.

The second memory 42 stores token values. Specifically, a second total token value, a second upper limit token value, and a standard token value are associated with each queue 23, and these token values are stored in the second memory 42. The second total token value indicates the sum of excessive token values that correspond to the excesses of the first total token value in the first memory 41 over the first upper limit value. The second upper limit token value indicates the upper limit value of the second total token value in the second memory 42. The standard token value is a standard value used for determining whether or not a whole token value included in the second total token value is added to the first total token value.

The queue management module 43 manages the input and output of packets with respect to a plurality of queues 23. Specifically, upon receiving packets from the queue sort module 31 or the bandwidth adjustment module 32 that is in a previous stage, the queue management module 43 stores the received packets in the queues 23. In addition, upon receiving the queue IDs of queues selected by the queue selection module 44, the queue management module 43 outputs packets from the queues 23 indicated by the queue IDs. In addition, hereinafter, a processing operation in which packets are stored in the queues 23 is called "enqueue", and a processing operation in which packets are output from the queues 23 is called "dequeue".

In addition, the queue management module 43 notifies the bandwidth controller 45 of the queue ID of a queue 23 that is subjected to the dequeue processing operation and the packet length of the dequeued packet. In addition, the queue management module 43 notifies the queue selection module 44 of queue state information that indicates whether or not packets are stored in a plurality of queues 23.

The queue selection module 44 selects a queue 23 to be an object for the output of a packet, in response to the first total token value read out from the first memory 41, and notifies the queue management module 43 of the queue ID of the selected queue 23. Specifically, the queue selection module 44 includes a round robin (RR) object flag setup module 51 and an RR processing module 52.

The RR object flag setup module 51 determines a queue 23, which can output a packet, from among the plurality of queues 23 in response to the first total token value in the first memory 41, and notifies the RR processing module 52 of the determination result. Specifically, the RR object flag setup module 51 discerns a queue 23, in which a packet is stored, in response to the queue state information given notice of by the queue management module 43, and reads out the first total token value of the queue 23 from the first memory 41. In addition, when the first total token value is greater than or equal to the packet length of a packet stored in a corresponding queue 23, the RR object flag setup module 51 sets an RR object flag "ON", which is used for allowing a packet to be output, in the queue ID of the queue 23. In addition, when the first total token value is greater than zero, the RR object flag setup module 51 may set the RR object flag "ON", which is used for allowing a packet to be output, in the queue ID of the queue 23.

In addition, when the first total token value is less than the packet length of a packet stored in a corresponding queue 23, the RR object flag setup module 51 sets an RR object flag "OFF", which is used for not allowing a packet to be output, in the queue ID of the queue 23. When the RR object flag setup module 51 discerns a queue 23, in which a packet is not stored, in response to the queue state information given notice of by the queue management module 43, the RR object flag setup module 51 sets the RR object flag "OFF", which indicates that a packet is unable to be output, in the queue ID of the queue 23. In addition, the RR object flag setup module 51 notifies the RR processing module 52 of the queue ID in which the RR object flag is set.

The RR processing module 52 applies the RR method to a queue ID, in which the RR object flag "ON" is set, from among queues ID given notice of by the RR object flag setup module 51. Specifically, the RR processing module 52 selects, using the RR method, a queue 23 corresponding to the queue ID, in which the RR object flag "ON" is set, from among queues ID given notice of by the RR object flag setup module 51, and transmits the queue ID of the selected queue 23 to the queue management module 43.

While the bandwidth controller 45 performs the token control, the bandwidth controller 45 stores a token value, which overflows from the first memory 41 owing to the token control, in the second memory 42, and adds a token value in the second memory 42 to the first storage module 11 when a token value is consumed from the first memory 41 in response to the output of a packet. Specifically, the bandwidth controller 45 includes a token controller 61, a queue monitor 62, an overrun state controller 63, and an underrun state controller 64.

The token controller 61 adds a predetermined token value to the first total token value in the first memory 41 with a predetermined period. Specifically, the token controller 61 reads out the first total token value and the additional token value from the first memory 41 with a predetermined period. In addition, when the second total token value read out from the second memory 42 by the overrun state controller 63 is zero, the token controller 61 adds the additional token value to the first total token value, and stores the first total token value subjected to the addition in the first memory 41.

In addition, the token controller 61 subtracts a predetermined token value from the first total token value in the first memory 41 in response to the output of a packet from a queue 23. Specifically, when the token controller 61 receives, from the queue management module 43, the queue ID of a queue 23 that is subjected to the dequeue processing operation and the packet length of a dequeued packet, the token controller 61 subtracts a token value that corresponds to the packet length from the first total token value of a queue 23 indicated by the queue ID. In addition, the token controller 61 stores the first total token value subjected to the subtraction in the first memory 41.

The queue monitor 62 monitors whether or not packets are stored in queues 23, and notifies the overrun state controller 63 of the monitoring result.

The overrun state controller 63 adds the excess of the first total token value over a predetermined upper limit value (referred to as "excessive token value") to the second token value in the second memory 42 when, at the time of the addition of a token value by the token controller 61, the first total token value subjected to the addition exceeds the predetermined upper limit value. Specifically, the overrun state controller 63 reads out the first total token value, the first upper limit token value, and the additional token value from the first memory 41. In addition, the overrun state controller 63 adds the additional token value to the first total token value. In addition, the overrun state controller 63 compares the first total token value subjected to the addition with the first upper limit token value, and when the first total token value subjected to the addition is greater than the first upper limit token value, the overrun state controller 63 calculates the excessive token value by subtracting the first upper limit token value from the first total token value. In addition, the overrun state controller 63 adds the calculated excessive token value to the second total token value read out from the second memory 42, and stores the second total token value subjected to the addition in the second memory 42.

In the embodiment, when the first total token value subjected to the addition of a token value exceeds the predetermined upper limit value and the queue monitor 62 notifies the overrun state controller 63 of a monitoring result that a packet is stored in a queue 23, the overrun state controller 63 adds the excessive token value to the second total token value. On the other hand, when the first total token value subjected to the addition of a token value exceeds the predetermined upper limit value and the queue monitor 62 notifies the overrun state controller 63 of a monitoring result that no packet is stored in a queue 23, the overrun state controller 63 discards the excessive token value. Accordingly, when no dequeue processing operation is necessary, the processing operation in which the excessive token value is added to the second total token value can be omitted, and the processing load of the overrun state controller 63 can be reduced.

When the first total token value falls below the predetermined upper limit value owing to the subtraction of a token value by the token controller 61, the underrun state controller 64 subtracts a predetermined token value from the second total token value, and adds the subtracted token value to the first total token value. In addition, the underrun state controller 64 adds the token value, subtracted from the second total token value, to the first total token value, along with the additional token value added to the first total token value with a predetermined period by the token controller 61.

Furthermore, when the second total token value is less than the standard token value, the underrun state controller 64 subtracts a whole token value from the second total token value, and adds the subtracted token value to the first total token value. On the other hand, when the second total token value is greater than or equal to the standard token value, the underrun state controller 64 subtracts a token value that corresponds to the standard token value from the second total token value, and adds the subtracted token values to the first total token value.

Specifically, when the token controller 61 reads out the first total token value and the additional token value from the first memory 41, the underrun state controller 64 reads out the second total token value and the standard token value from the second memory 42. In addition, when the second total token value is greater than zero, the underrun state controller 64 compares the second total token value and the standard token value in magnitude. In addition, when the second total token value is less than or equal to the standard token value, the underrun state controller 64 subtracts a whole token value from the second total token value, and adds the subtracted token value, namely a token value that corresponds to the second total token value, to the additional token value. In addition, the underrun state controller 64 adds the additional token value subjected to the addition to the first total token value, and stores the first total token value subjected to the addition in the first memory 41.

On the other hand, when the second total token value exceeds the standard token value, the underrun state controller 64 subtracts a token value, which corresponds to the standard total token value, from the second total token value, and adds the subtracted token values to the additional token value. In addition, the underrun state controller 64 adds the additional token value subjected to the addition to the first total token value, and stores the first total token value subjected to the addition in the first memory 41.

In addition, while, in the embodiment, the example of the configuration in which the token controller 61 and the underrun state controller 64 are dispersed is illustrated, a configuration in which the token controller 61 and the underrun state controller 64 are arbitrarily integrated may be adopted. In addition, the packet management module 21 and the scheduler 22 are, for example, integrated circuits such as application specific integrated circuits (ASICs), field programmable gate arrays (FPGAs), or the like. In addition, the first memory 41 and the second memory 42 are, for example, semiconductor memory devices such as random access memories (RAMs), erasable programmable read only memories (EPROM), flash memories, or the like.

Figure 7:
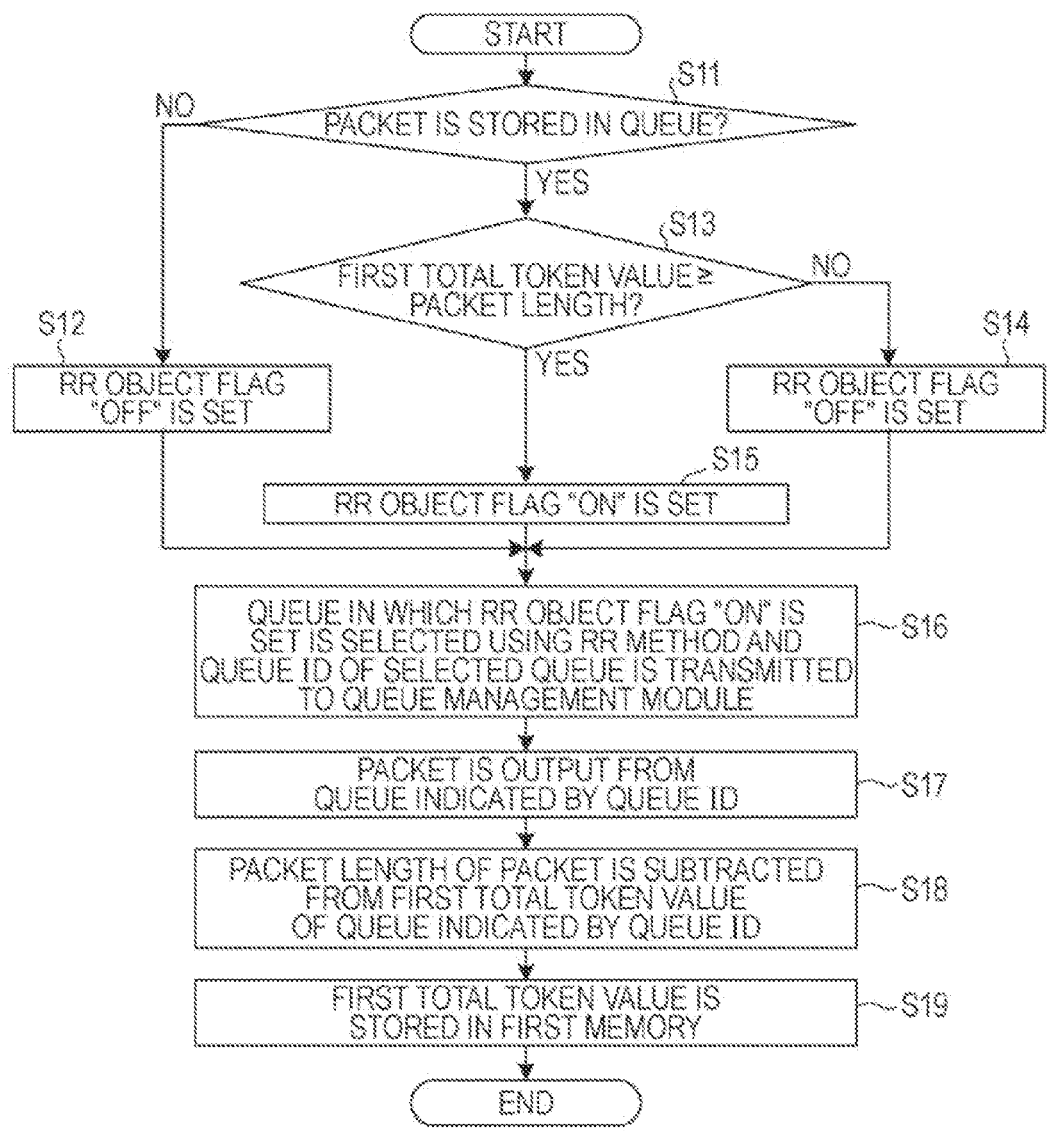
FIG. 7 is a flowchart illustrating a processing procedure of a packet output processing operation performed in the packet transmission device according to the second embodiment.

Processing Operation Perform in Packet Transmission Device According to Second Embodiment Next, a processing operation performed in the packet transmission device according to the second embodiment will be described. Here, first, a packet output processing operation will be described. After that, an overrun state control processing operation and an underrun state control processing operation will be described in this order. FIG. 7 is a flowchart illustrating a processing procedure of the packet output processing operation performed in the packet transmission device according to the second embodiment. FIG. 8 is a flowchart illustrating a processing procedure of the overrun state control processing operation performed in the bandwidth controller 45 according to the second embodiment. FIG. 9 is a flowchart illustrating a processing procedure of the underrun state control processing operation performed in the bandwidth controller 45 according to the second embodiment. In addition, the processing operations illustrated in FIGS. 8 and 9 are periodically executed with a predetermined period by the bandwidth controller 45.

Packet Output Processing Operation

FIG. 7 is the flowchart illustrating the processing procedure of the packet output processing operation performed in the packet transmission device 20. In addition, it may be assumed that the processing operation illustrated in FIG. 7 is periodically executed with a predetermined period. As illustrated in FIG. 7, in the packet transmission device 20, in response to the queue state information given notice of by the queue management module 43, the queue selection module 44 in the bandwidth adjustment module 32 determines whether or not a packet is stored in a queue 23 (Step S11). When no packet is stored in the queue 23 (Step S11: NO), the queue selection module 44 sets the RR object flag "OFF", which indicates that a packet is unable to be output, in the queue ID of the queue 23 (Step S12).

On the other hand, when a packet is stored in the queue 23 (Step S11: YES), the queue selection module 44 reads out the first total token value that corresponds to the queue 23 from the first memory 41. In addition, the queue selection module 44 determines whether or not the first total token value is greater than or equal to the packet length of the packet stored in the corresponding queue 23 (Step S13). When the first total token value is less than the packet length of the packet stored in the corresponding queue 23 (Step S13: NO), the queue selection module 44 sets the RR object flag "OFF" in the queue ID of the queue 23 (Step S14). On the other hand, when the first total token value is greater than or equal to the packet length of the packet stored in the corresponding queue 23 (Step S13: YES), the queue selection module 44 sets the RR object flag "ON", which is used for allowing a packet to be output, in the queue ID of the queue 23 (Step S15). In addition, when the queue selection module 44 determines whether or not the first total token value is greater than zero and it is determined that the first total token value is greater than zero, the queue selection module 44 may set the RR object flag "ON", which is used for allowing a packet to be output, in the queue ID of the queue 23.

Following this, the queue selection module 44 selects, using the RR method, a queue 23 corresponding to the queue ID, in which the RR object flag "ON" is set, from among queues 23 indicated by the queues ID in which the RR object flags are set, and transmits the queue ID of the selected queue 23 to the queue management module 43 (Step S16).

Following this, upon receiving the queue ID of the queue 23 selected by the queue selection module 44, the queue management module 43 outputs a packet from the queue 23 indicated by the queue ID (Step S17). In addition, when the bandwidth controller 45 receives the queue ID of the queue 23 that is subjected to the dequeue processing operation and the packet length of a dequeued packet from the queue management module 43, the bandwidth controller 45 subtracts a token value that corresponds to the packet length from the first total token value of a queue 23 indicated by the queue ID (Step S18). In addition, the bandwidth controller 45 stores the first total token value subjected to the subtraction in the first memory 41 (Step S19).

Overrun State Control Processing Operation

FIG. 8 is a flowchart illustrating the processing procedure of the overrun state control processing operation performed in the bandwidth controller 45. In addition, it may be assumed that the processing procedure illustrated in FIG. 8 is executed, for example, every time when a predetermined token value is added to the first total token value in the first memory 41. As illustrated in FIG. 8, in the bandwidth controller 45, the overrun state controller 63 reads out the first total token value, the first upper limit token value, and the additional token value from the first memory 41 (Step S31). In addition, the overrun state controller 63 adds the additional token value to the first total token value (Step S32). In addition, the overrun state controller 63 compares the first total token value subjected to the addition with the first upper limit token value (Step S33), and when the first total token value subjected to the addition is less than or equal to the first upper limit token value (Step S33: NO), the overrun state controller 63 sets the excessive token value to zero (no excessive token value) (Step S34).

On the other hand, when the first total token value subjected to the addition of a token value is greater than the first upper limit token value (Step S33: YES), the overrun state controller 63 determines, on the basis of the monitoring result supplied from the queue monitor 62, whether or not a packet is stored in the queue 23 (Step S35). In addition, when it is determined that no packet is stored in the queue 23 (Step S35: NO), the overrun state controller 63 sets the excessive token value to zero (discarded) (Step S36), and updates the first total token value to the first upper limit token value (Step S37). On the other hand, when it is determined that a packet is stored in the queue 23 (Step S35: YES), the overrun state controller 63 calculates the excessive token value by subtracting the first upper limit token value from the first total token value (Step S38). In addition, the overrun state controller 63 updates the first total token value to the first upper limit token value (Step S39).

After that, the overrun state controller 63 stores the first total token value in the first memory 41 (Step S40), and reads out the second total token value and the second upper limit token value from the second memory 42 (Step S41). In addition, the overrun state controller 63 adds the excessive token value, obtained in Step S34, S36, or S38, to the second total token value (Step S42), and compares the second total token value subjected to the addition with the second upper limit token value (Step S43).

In addition, when the second total token value subjected to the addition is greater than the second upper limit token value (Step S43: YES), the overrun state controller 63 updates the second total token value to the second upper limit token value (Step S44), and stores the second total token value in the second memory 42 (Step S45). On the other hand, when the second total token value subjected to the addition is less than or equal to the second upper limit token value (Step S43: NO), the overrun state controller 63 stores the current second total token value in the second memory 42 (Step S45).

Underrun State Control Processing Operation

FIG. 9 is a flowchart illustrating the processing procedure of the underrun state control processing operation performed in the bandwidth controller 45. In addition, it may be assumed that the processing procedure illustrated in FIG. 9 is executed, for example, every time when a predetermined token value is added to the first total token value in the first memory 41. As illustrated in FIG. 9, in the bandwidth controller 45, the token controller 61 reads out the first total token value and the additional token value from the first memory 41 (Step S51), and the underrun state controller 64 reads out the second total token value and the standard token value (Step S52).

In addition, the underrun state controller 64 determines whether or not the second total token value is greater than zero (Step S53). When the second total token value is zero (Step S53: NO), the processing operation proceeds to Step S59 in the underrun state controller 64. On the other hand, when the second total token value is greater than zero (Step S53: YES), the underrun state controller 64 compares the second total token value with the standard token value (Step S54).

When the second total token value is less than or equal to the standard token value (Step S54: NO), the underrun state controller 64 subtracts a whole token value from the second total token value, and adds the subtracted token value, namely a token value that corresponds to the second total token value, to the additional token value (Step S55). In addition, the underrun state controller 64 sets the second total token value to zero (no second total token value) (Step S56).

On the other hand, when the second total token value exceeds the standard token value (Step S54: YES), the underrun state controller 64 subtracts a token value that corresponds to the standard token value from the second token value, and adds the subtracted token value to the additional token value (Step S57). In addition, the underrun state controller 64 subtracts the standard token value from the second total token value so as to update the second total token value (Step S58).

After that, the underrun state controller 64 adds the additional token value to the first total token value (Step S59), and stores the first total token value subjected to the addition in the first memory 41 (Step S60). In addition, the underrun state controller 64 stores the second total token value in the second memory 42 (Step S61).

Advantageous Effect of Second Embodiment

As described above, the packet transmission device 20 according to the second embodiment stores a token value, which overflows from the first memory 41 owing to the token control, in the second memory 42, and adds a token value in the second memory 42 to the first storage module 11 when a token value is consumed from the first memory 41 in response to the output of a packet. Therefore, the packet transmission device 20 can more quickly increase the first total token value in the first memory 41 than a method of the related art, in which a predetermined token value is added with a predetermined period, using the normal token control. This means that, when the packet transmission device 20 sequentially selects a queue, using, for example, the RR method, the first total token value that is greater can be held in the first memory 41 that corresponds to the selected queue. Accordingly, the packet transmission device 20 can more quickly output a packet in response to the first total token value in the first memory 41. As a result, the packet transmission device 20 can suppress the decrease of the bandwidth, compared with a method of the related art, in which all the excess of a token value over the upper limit value of a memory is discarded.

Figure 11:
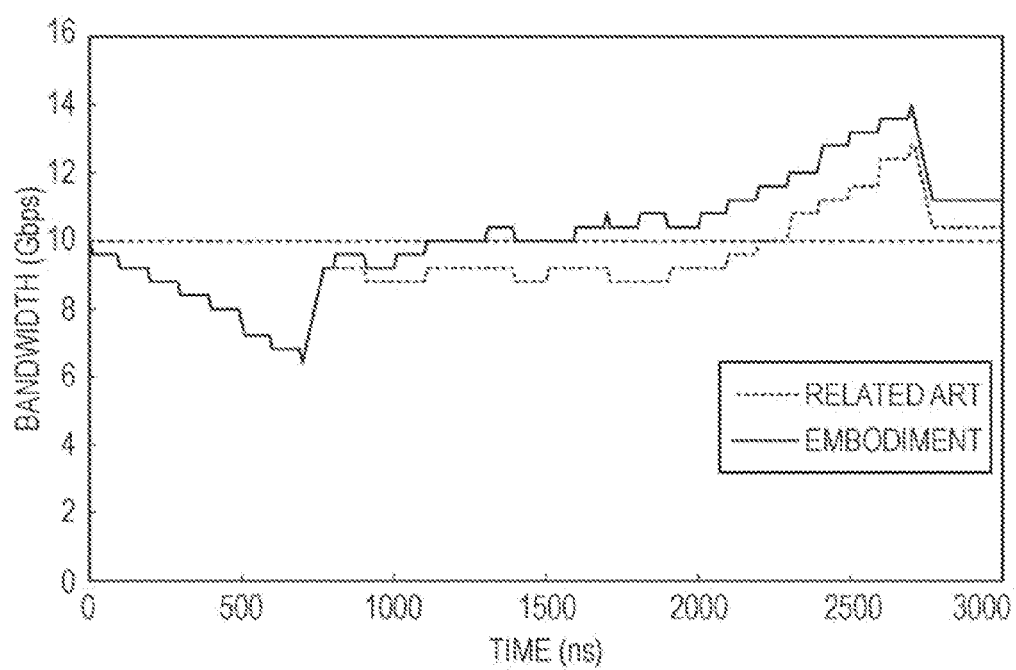
FIG. 11 is a diagram for explaining an advantageous effect of the packet transmission device according to the second embodiment.

FIGS. 10A, 10B, and 11 are diagrams for explaining the advantageous effect of the packet transmission device 20. FIGS. 10A and 10B illustrate results obtained by comparing an example of the related art with the embodiment with respect to the accumulated amount of packet quantities output from the queue #0 during the period of 1100 ns, in a case in which a total of 2048 queues, including a queue #0 the bandwidth of which is 10 Gbps and queues #1 to #2047 each bandwidth of which is 1 Gbps, is contained in one line. In addition, in FIG. 11, the transition of the bandwidth of the queue #0 is indicated on a time axis.

In the example of the related art illustrated in FIG. 10A, all the excess of a token value over an upper limit value is discarded. Namely, in the example of the related art, an additional token value 1000 bits is added to a total token value in a memory with a period of 100 ns. In addition, when the total token value has reached an upper limit value 5000 bits during a period from 0 ns to 500 ns, the excess of the token value over the upper limit value is discarded during a period from 500 ns to 700 ns. Here, in the example of the related art, during a period from 0 ns to 700 ns, it is assumed that the output of packets from the queues #1 to #2047 are executed, and the output of packets from the queue #0 is halted.

In addition, in the example of the related art, after 710 ns, packets, each packet length of which is 800 bits, start to be output from the queue #0 every 10 ns, and a token value that corresponds to the packet length 800 bits is subtracted from the total token value in response to the output of the packet. In addition, in the example of the related art, an additional token value 1000 bits is added to the total token value at 800 ns again. However, since a packet, the packet length of which is 800 bits, has been output, the total token value turns out to be −400<0. Therefore, in the example of the related art, no packet is output during a period from 800 ns to 900 ns. For a similar reason, in the example of the related art, no packet is output during a period from 1000 ns to 1100 ns.

On the other hand, in the embodiment illustrated in FIG. 10B, in the same way as in the example of the related art illustrated in FIG. 10A, the additional token value 1000 bits is added to the first total token value in the first memory 41 with a period of 100 ns. However, in the embodiment, unlike the example of the related art, when the first total token value has reached the upper limit value 5000 bits during a period from 0 ns to 500 ns, the excess of the token value over the upper limit value during a period from 500 ns to 700 ns is added to the second total token value in the second memory 42. Here, in the embodiment, during a period from 0 ns to 700 ns, in the same way as in the example of the related art, it is assumed that the output of packets from the queues #1 to #2047 is executed, and the output of packets from the queue #0 is halted.

In addition, in the embodiment, in the same way as in the example of the related art, after 710 ns, packets, each packet length of which is 800 bits, are output from the queue #0 every 10 ns, and a token value that corresponds to the packet length 800 bits is subtracted from the first total token value in response to the output of the packet. In addition, in the embodiment, in the same way as in the example of the related art, the additional token value 1000 bits is added to the first total token value at 800 ns. However, in the embodiment, unlike the example of the related art, a token value 500 bits subtracted from the second total token value is added to the first total token value, along with the additional token value 1000 bits. Therefore, in the embodiment, even if a packet, the packet length of which is 800 bits is output at 800 ns, the first total token value can be temporarily increased to 100 bits. Accordingly, in the embodiment, unlike the example of the related art, a packet, the packet length of which is 800 bits, can be output at 810 ns. For a similar reason, in the embodiment, unlike the example of the related art, a packet, the packet length of which is 800 bits, can be output at 1010 ns.

In this way, in the packet transmission device 20, since the first total token value in the first memory 41 can be temporarily increased, the amount of packets output in response to the first total token value in the first memory 41 can be temporarily increased. For example, in the examples illustrated in FIGS. 10A and 10B, in the packet transmission device 20 according to the second embodiment, compared with the example of the related art in which all the excess of a token value over the upper limit value is discarded, the output amount of packets can be increased by 1600 bits.

As a result, in the packet transmission device 20, compared with the example of the related art in which all the excess of a token value over the upper limit value is discarded, the decrease of the bandwidth can be suppressed. For example, in both the example of the related art and the embodiment, illustrated in FIG. 11, since the output of packets from the queue #0 is halted during a period from 0 ns to 700 ns, the bandwidth of the queue #0 is less the 10 Gbps. However, in the embodiment, as described with reference to FIGS. 10A and 10B, after 800 ns, a token value subtracted from the second total token value is added to the first total token value, along with the additional token value. Therefore, in the embodiment, after 800 ns, the output amount of packets can be increased compared with the example of the related art. Accordingly, in the embodiment, compared with the example of the related art, the bandwidth that has been less than 10 Gbps can be quickly recovered to 10 Gbps, and hence the decrease of the bandwidth can be suppressed.

In addition, while the packet transmission device 20 outputs a packet in response to the first total token value in the first memory 41, the packet transmission device 20 does not increase the upper limit value of the first memory 41. Therefore, the packet transmission device 20 can prevent a burst of signals in a facing device from occurring.

In addition, when the first total token value in the first memory 41 exceeds the upper limit token value and a packet is stored in a queue 23, the packet transmission device 20 adds the excessive token value to the second total token value in the second memory 42. Accordingly, in the packet transmission device 20, when no dequeue processing operation is necessary, the processing operation in which the excessive token value is added to the second total token value can be omitted, the processing load can be reduced.

In addition, in the packet transmission device 20, a token value, subtracted from the second total token value, is added to the first total token value, along with a token value added to the first total token value with a predetermined period. Therefore, in the packet transmission device 20, an existing processing operation in which a token value is added to the first total token value with a predetermined period is performed, and, at the same time, a processing operation in which a token value, subtracted from the second total token value, is added to the first total token value can be performed. Therefore, the increase of the processing load can be suppressed.

In addition, in the packet transmission device 20, if the second total token value exceeds the standard token value, a token value that corresponds to the standard token value is subtracted from the second total token value, and the subtracted token value is added to the first total token value. Therefore, in the packet transmission device 20, a token value to be added to the first total token value can be defined on the basis of the magnitude of the standard token value, and the temporarily increased amount of the first total token value can be adjusted in minute detail. As a result, in the packet transmission device 20, the decrease of the bandwidth can be more certainly suppressed.

Third Embodiment

In the second embodiment, the example has been described in which the first memory 41 and the second memory 42 are configured as separate memories, and a token value that overflows from the first memory 41 owing to the token control is stored in the second memory 42. However, on condition that the first memory 41 and the second memory 42 are integrated into one memory, a token value that overflows from the first memory 41 owing to the token control may be stored in the second memory 42. Therefore, in the third embodiment, an example will be described in which the first memory 41 and the second memory 42 are integrated into one memory, and a token value that overflows from the first memory 41 owing to the token control is stored in the second memory 42.

Figure 12:
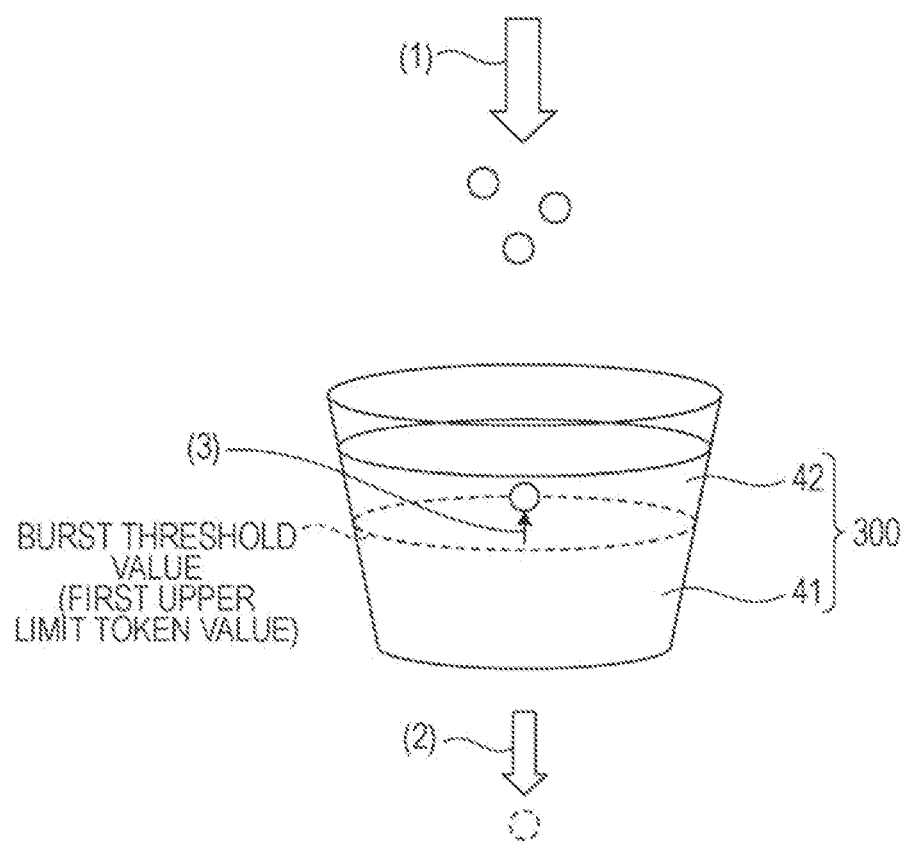
FIG. 12 is a diagram for explaining a token control method performed in a packet transmission device according to a third embodiment.

Token Control Method Performed in Packet Transmission Device According to Third Embodiment First, a token control method performed in a packet transmission device according to a third embodiment will be described. FIG. 12 is a diagram for explaining the token control method performed in the packet transmission device according to the third embodiment.

As illustrated in FIG. 12, the packet transmission device according to the third embodiment includes a memory 300 into which the first memory 41 and the second memory 42, illustrated in FIG. 6, are integrated, and a burst threshold value is set in the memory 300. The burst threshold value is a threshold value used for specifying the maximum value of a packet amount that can be output to a facing device at one time. When packets the amount of which is less than or equal to the burst threshold value is output, the occurrence of a burst in the facing device that receives packets turns out to be averted. In the present embodiment, as the burst threshold value, the first upper limit token value of the first memory 41 is set.

In such a configuration as described above, the packet transmission device according to the present embodiment adds a predetermined token value to the first total token value in the first memory 41 with a predetermined period (refer to (1) in FIG. 12). In addition, the packet transmission device according to the present embodiment subtracts a predetermined token value from the first total token value in the first memory 41 in response to the output of a packet (refer to (2) in FIG. 12).

In addition, when the first total token value subjected to the addition of a token value exceeds the burst threshold value, the packet transmission device according to the present embodiment adds the excess of the first total token value over the burst threshold value to the second total token value in the second memory 42 (refer to (3) in FIG. 12).

In this way, the packet transmission device according to the present embodiment includes the memory 300 into which the first memory 41 and the second memory 42 are integrated, and stores a token value that overflows from the first memory 41 in the second memory 42. Therefore, in the same way as in the first embodiment, the packet transmission device according to the present embodiment can suppress the decrease of the bandwidth, compared with a method of the related art, in which all the excess of a token value over the upper limit value of a memory is discarded. Furthermore, since the first memory 41 and the second memory 42 are integrated into the memory 300, the device configuration of the packet transmission device according to the present embodiment can be simplified.

Configuration of Packet Transmission Device According to Third Embodiment

Figure 13:
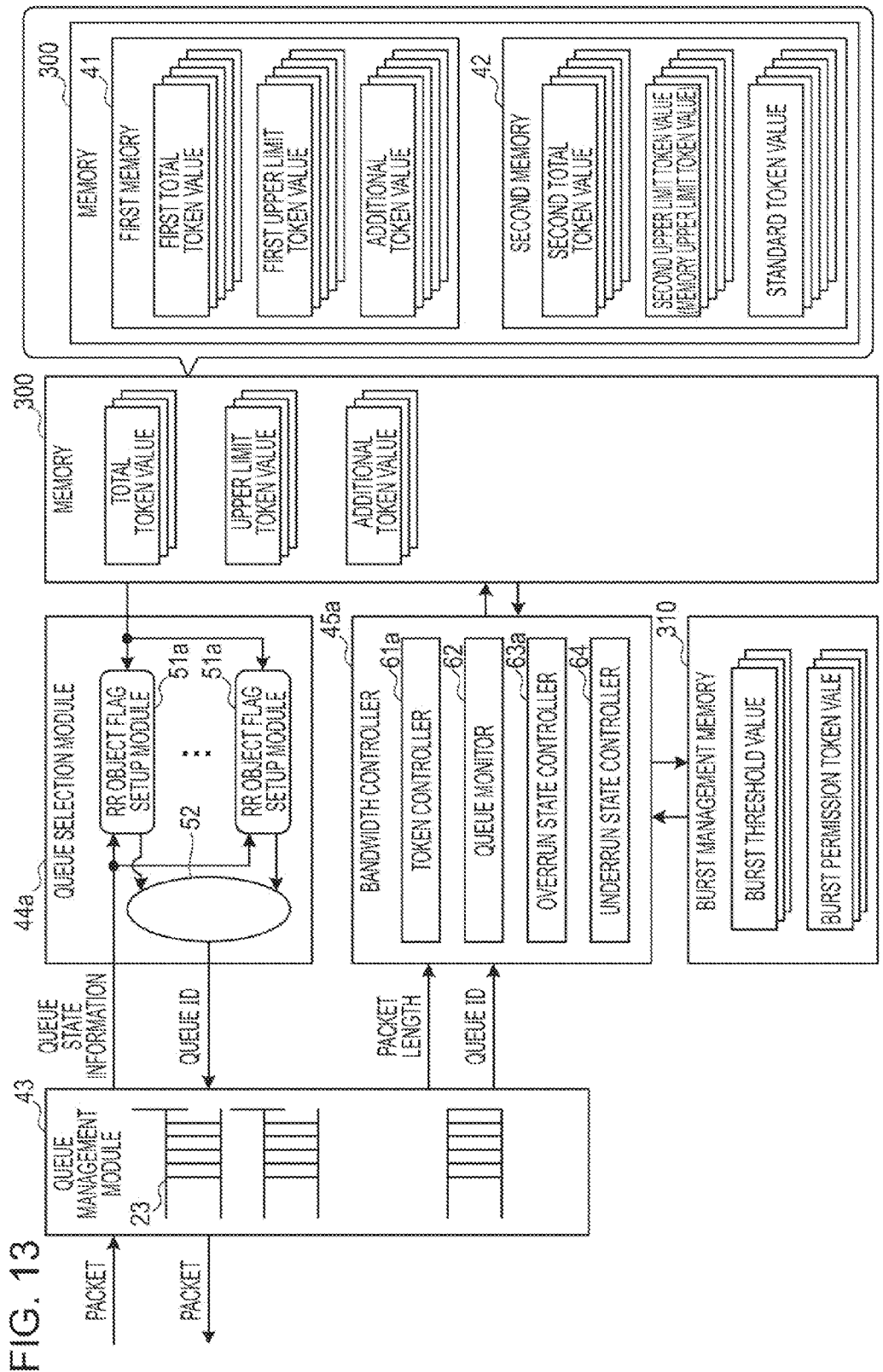
FIG. 13 is a block diagram illustrating a configuration of a bandwidth adjustment module included in the packet transmission device according to the third embodiment.

Next, the configuration of a bandwidth adjustment module included in the packet transmission device according to the third embodiment will be described. FIG. 13 is a block diagram illustrating the configuration of a bandwidth adjustment module 32*a* included in a packet transmission device 20*a* according to the third embodiment. In addition, hereinafter, the same symbol is assigned to a portion that includes the same function as that of the configuration component illustrated in FIG. 6, and the description thereof will be omitted. In addition, the configuration of the packet transmission device 20*a* is the same as that illustrated in FIG. 5, and hence the description thereof will be omitted herein.

As illustrated in FIG. 13, the bandwidth adjustment module 32*a* includes the memory 300 and a burst management memory 310 in place of the first memory 41 and the second memory 42, illustrated in FIG. 6. In addition, the bandwidth adjustment module 32*a* includes a queue selection module 44*a* and a bandwidth controller 45*a* in place of the queue selection module 44 and the bandwidth controller 45, illustrated in FIG. 6.

The memory 300 is a memory into which the first memory 41 and the second memory 42 are integrated. In the present embodiment, the first upper limit token value stored in the first memory 41 is set as a burst threshold value in the burst management memory 310, described later. In addition, the second upper limit token value stored in the second memory 42 indicates the upper limit value of token values stored in the entire memory 300 (the first memory 41 and the second memory 42). In addition, hereinafter, the second upper limit token value stored in the second memory 42 will be called a "memory upper limit token value".

The burst management memory 310 stores various kinds of information used for controlling a burst (discard of packets) that occurs in a facing device. Specifically, the burst management memory 310 associates a burst permission token value and a burst threshold value with each queue 23, and stores these token values therein. The burst permission token value indicates a token value corresponding to a packet amount that can be output to the facing device at one time. The burst threshold value is a threshold value used for specifying the maximum value of a packet amount that can be output to the facing device at one time, and indicates the upper limit value of the burst permission token value. In the present embodiment, the first upper limit token value stored in the first memory 41 is set to the burst threshold value.

The queue selection module 44*a* selects a queue 23 to be an object for the output of a packet, and notifies the queue management module 43 of the queue ID of the selected queue 23. Specifically, the queue selection module 44*a* includes a round robin (RR) object flag setup module 51*a* and an RR processing module 52.

The RR object flag setup module 51*a* determines a queue 23, which can output a packet, from among the plurality of queues 23 in response to the first total token value in the first memory 41 and the burst permission token value in the burst management memory 310, and notifies the RR processing module 52 of the determination result. Specifically, the RR object flag setup module 51*a* discerns a queue 23, in which a packet is stored, in response to the queue state information given notice of by the queue management module 43, and reads out the first total token value of the corresponding queue 23 from the first memory 41. In addition, the RR object flag setup module 51*a* reads out the burst permission token value for the corresponding queue 23 from the burst management memory 310. In addition, when the first total token value is greater than zero and the burst permission token value is greater than zero, the RR object flag setup module 51*a* sets an RR object flag "ON", which is used for allowing a packet to be output, in the queue ID of the queue 23.

In addition, when the first total token value is less than or equal to zero or the burst permission token value is less than or equal to zero, the RR object flag setup module 51*a* sets an RR object flag "OFF", which is used for not allowing a packet to be output, in the queue ID of the corresponding queue 23. In addition, when the RR object flag setup module 51*a* discerns a queue 23, in which a packet is not stored, in response to the queue state information given notice of by the queue management module 43, the RR object flag setup module 51*a* sets the RR object flag "OFF", which indicates that a packet is unable to be output, in the queue ID of the corresponding queue 23. In addition, the RR object flag setup module 51*a* notifies the RR processing module 52 of the queue ID in which the RR object flag is set.

While the bandwidth controller 45*a* performs the token control, the bandwidth controller 45*a* stores a token value, which overflows from the first memory 41 owing to the token control, in the second memory 42, and adds a token value in the second memory 42 to the first memory 41 when a token value is consumed from the first memory 41 in response to the output of a packet. Specifically, the bandwidth controller 45*a* includes a token controller 61*a*, a queue monitor 62, an overrun state controller 63*a*, and an underrun state controller 64.

Basically, the token controller 61*a* performs the same processing operation as that in the token controller 61 illustrated in FIG. 6. Furthermore, the token controller 61*a* subtracts a predetermined token value from the burst permission token value in the burst management memory 310 in response to the output of a packet from a queue 23. Specifically, when the token controller 61*a* receives from the queue management module 43 the queue ID of a queue 23 that is subjected to the dequeue processing operation and the packet length of a dequeued packet, the token controller 61*a* subtracts a token value that corresponds to the packet length from the burst permission token value of a queue 23 indicated by the queue ID. In addition, the token controller 61*a* stores the burst permission token value subjected to the subtraction in the burst management memory 310.

The overrun state controller 63a adds the excess of the first total token value over a predetermined upper limit value (referred to as "excessive token value", hereinafter) to the second total token value in the second memory 42 when, at the time of the addition of a token value by the token controller 61a, the first total token value subjected to the addition exceeds the predetermined upper limit value.

Specifically, the overrun state controller 63a reads out the first total token value and the additional token value from the first memory 41. In addition, the overrun state controller 63a reads out the burst threshold value and the burst permission token value from the burst management memory 310. In addition, the overrun state controller 63a adds the additional token value to the first total token value. In addition, the overrun state controller 63a compares the first total token value subjected to the addition of the additional token value with the burst threshold value, and when the first total token value subjected to the addition is less than or equal to the burst threshold value, the overrun state controller 63a sets the excessive token value to zero (no excessive token value).

On the other hand, when the first total token value subjected to the addition is greater than the burst threshold value, the overrun state controller 63a determines, on the basis of the monitoring result supplied from the queue monitor 62, whether or not a packet is stored in the queue 23. In addition, when it is determined that no packet is stored in the queue 23, the overrun state controller 63a sets the excessive token value to zero (discarded). On the other hand, when it is determined that a packet is stored in the queue 23, the overrun state controller 63a compares the first total token value subjected to the addition of the additional token value with the memory upper limit token value.

In addition, when the first total token value subjected to the addition is less than or equal to the memory upper limit token value, the overrun state controller 63a calculates the excessive token value by subtracting the burst threshold value from the first total token value. On the other hand, when the first total token value subjected to the addition is greater than the memory upper limit token value, the overrun state controller 63a calculates the excessive token value by subtracting the burst threshold value from the memory upper limit token value. In addition, the overrun state controller 63a updates the first total token value to the burst threshold value. In addition, the overrun state controller 63a adds the calculated excessive token value to the second total token value read out from the second memory 42, and stores the second total token value subjected to the addition in the second memory 42.

At the time of the addition of a token value by the token controller 61a, the overrun state controller 63a updates the burst permission token value to the burst threshold value, and stores the updated burst permission token value in the burst management memory 310.

Figure 14:
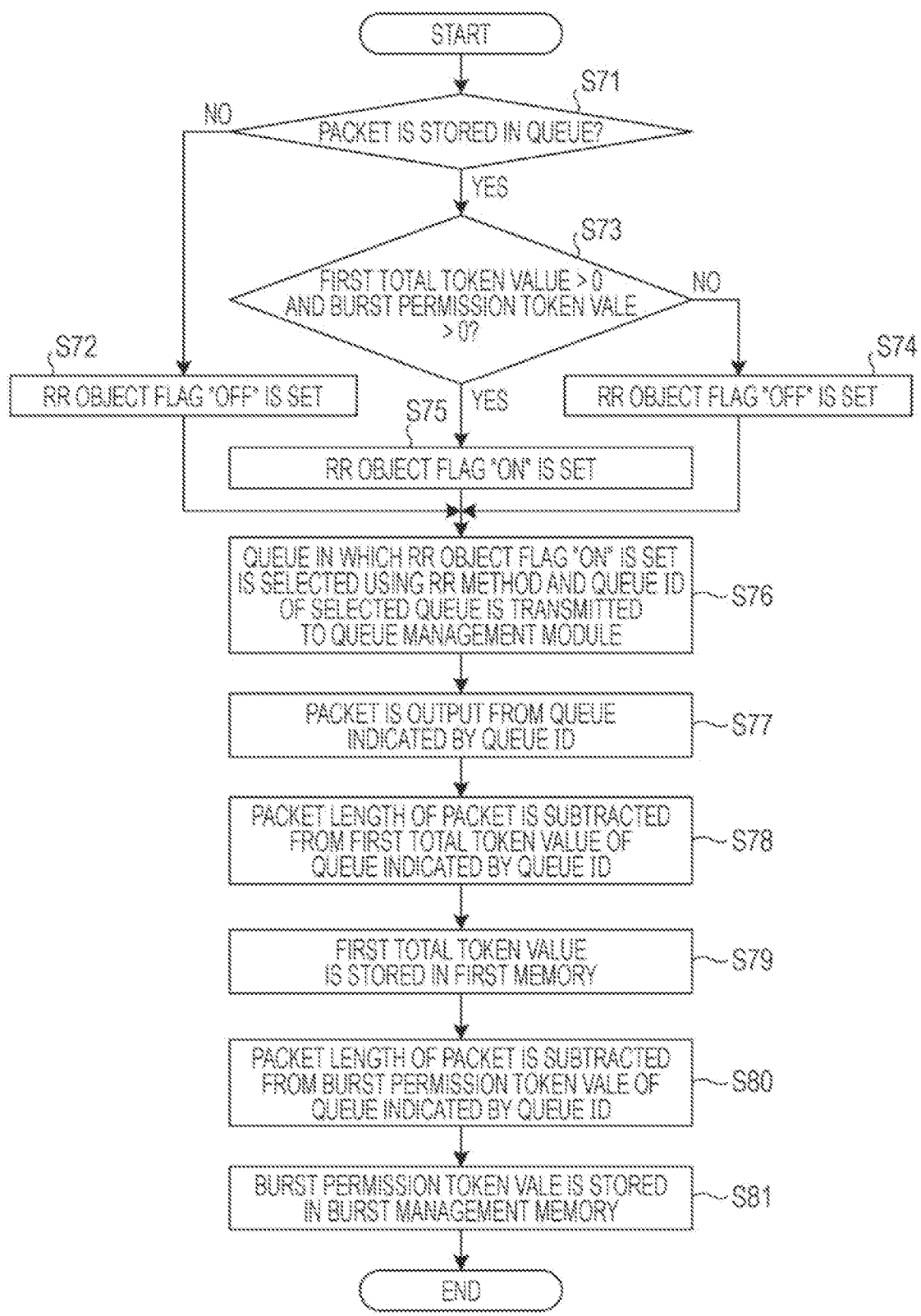
FIG. 14 is a flowchart illustrating a processing procedure of a packet output processing operation performed in the packet transmission device according to the third embodiment.

Processing Operation Performed in Packet Transmission Device According to Third Embodiment Next, a processing operation performed in the packet transmission device 20a according to the third embodiment will be described. Here, first, a packet output processing operation will be described. After that, an overrun state control processing operation will be described. FIG. 14 is a flowchart illustrating the processing procedure of the packet output processing operation performed in the packet transmission device 20a according to the third embodiment. FIG. 15A is a flowchart illustrating the processing procedure of the overrun state control processing operation performed in the bandwidth controller 45a according to the third embodiment. In addition, since the processing procedure of an underrun state control processing operation performed in the bandwidth controller 45a according to the third embodiment is the same as the processing procedure illustrated in FIG. 9, the description thereof will be omitted herein.

Packet Output Processing Operation

FIG. 14 is the flowchart illustrating the processing procedure of the packet output processing operation performed in the packet transmission device 20a according to the third embodiment. As illustrated in FIG. 14, in the packet transmission device 20a, in response to the queue state information given notice of by the queue management module 43, the queue selection module 44a in the bandwidth adjustment module 32a determines whether or not a packet is stored in a queue 23 (Step S71). When no packet is stored in the queue 23 (Step S71: NO), the queue selection module 44a sets the RR object flag "OFF", which indicates that a packet is unable to be output, in the queue ID of the corresponding queue 23 (Step S72).

On the other hand, when a packet is stored in the queue 23 (Step S71: YES), the queue selection module 44a reads out the first total token value that corresponds to the corresponding queue 23 from the first memory 41. Furthermore, the queue selection module 44a reads out the burst permission token value that corresponds to the corresponding queue 23 from the burst management memory 310. In addition, the queue selection module 44a determines whether or not the first total token value is greater than zero and the burst permission token value is greater than zero (Step S73). When the first total token value is less than or equal to zero or the burst permission token value is less than or equal to zero, the queue selection module 44a sets the RR object flag "OFF" in the queue ID of the corresponding queue 23 (Step S74). On the other hand, when the first total token value is greater than zero and the burst permission token value is greater than zero, the queue selection module 44a sets the RR object flag "ON", which is used for allowing a packet to be output, in the queue ID of the corresponding queue 23 (Step S75).

Following this, the queue selection module 44a selects, using the RR method, a queue 23 corresponding to the queue ID, in which the RR object flag "ON" is set, from among queues 23 indicated by the queues ID in which the RR object flags are set, and transmits the queue ID of the selected queue 23 to the queue management module 43 (Step S76).

Following this, upon receiving the queue ID of the queue 23 selected by the queue selection module 44a, the queue management module 43 outputs a packet from the queue 23 indicated by the corresponding queue ID (Step S77).

In addition, when the bandwidth controller 45a receives the queue ID of the queue 23 that is subjected to the dequeue processing operation and the packet length of a dequeued packet from the queue management module 43, the bandwidth controller 45a subtracts a token value that corresponds to the packet length from the first total token value of the queue 23 indicated by the queue ID (Step S78). In addition, the bandwidth controller 45a stores the first total token value subjected to the subtraction in the first memory 41 (Step S79).

In addition, the bandwidth controller 45a subtracts a token value that corresponds to the packet length from the burst permission token value of the queue 23 indicated by the queue ID (Step S80). In addition, the bandwidth controller 45a stores the burst permission token value subjected to the subtraction in the burst management memory 310 (Step S81).

Overrun State Control Processing Operation

FIG. 15A is a flowchart illustrating the processing procedure of the overrun state control processing operation performed in the bandwidth controller 45a according to the third embodiment. In addition, it may be assumed that the processing procedure illustrated in FIG. 15A is executed, for example, every time a predetermined token value is added to the first total token value in the first memory 41. As illustrated in FIG. 15A, in the bandwidth controller 45*a*, first, the overrun state controller 63*a* reads out the first total token value and the additional token value from the first memory 41 (Step S91). In addition, the overrun state controller 63*a* reads out the burst threshold value and the burst permission token value from the burst management memory 310 (Step S92). In addition, the overrun state controller 63*a* adds the additional token value to the first total token value (Step S93). In addition, the overrun state controller 63*a* compares the first total token value subjected to the addition with the burst threshold value (Step S94), and when the first total token value subjected to the addition is less than or equal to the burst threshold value (Step S94: NO), the overrun state controller 63*a* sets the excessive token value to zero (no excessive token value) (Step S95), and the processing operation proceeds to Step S102.

On the other hand, when the first total token value subjected to the addition is greater than the burst threshold value (Step S94: YES), the overrun state controller 63*a* determines, on the basis of the monitoring result supplied from the queue monitor 62, whether or not a packet is stored in the queue 23 (Step S96). In addition, when it is determined that no packet is stored in the queue 23 (Step S96: NO), the overrun state controller 63*a* sets the excessive token value to zero (discarded) (Step S97). On the other hand, when it is determined that a packet is stored in the queue 23 (Step S96: YES), the overrun state controller 63*a* compares the first total token value subjected to the addition of the additional token value with the memory upper limit token value (Step S98).

In addition, when the first total token value subjected to the addition is less than or equal to the memory upper limit token value (Step S98: NO), the overrun state controller 63*a* calculates the excessive token value by subtracting the burst threshold value from the first total token value (Step S99). On the other hand, when the first total token value subjected to the addition is greater than the memory upper limit token value (Step S98: YES), the overrun state controller 63*a* calculates the excessive token value by subtracting the burst threshold value from the memory upper limit token value (Step S100). Furthermore, when the overrun state controller 63*a* calculates the excessive token value through the processing operation performed in Steps S97, S99, or S100, the overrun state controller 63*a* updates the first total token value to the burst threshold value (Step S101).

In addition, the overrun state controller 63*a* stores the first total token value in the first memory 41 (Step S102), and reads out the second total token value from the second memory 42 (Step S103). In addition, the overrun state controller 63*a* updates the second total token value to the excessive token value calculated through the processing operation performed in Steps S95, S97, S99, or S100 (Step S104), and stores the updated second total token value in the second memory 42 (Step S105).

In addition, the overrun state controller 63*a* updates the burst permission token value to the burst threshold value (Step S106), and stores the updated burst permission token value in the burst management memory 310 (Step S107).

In addition, the processing procedure illustrated in FIG. 15A has been described for sake of simplicity on the condition that there are two parameter values such as the first total token value and the second total token value. However, in the packet transmission device 20*a* according to the present embodiment, as illustrated in FIG. 13, actually the first total token value and the second total token value are integrated into a total token value that is one parameter, and a token value is exchanged within the total token value. The processing procedure of an overrun state control processing operation performed when the packet transmission device 20*a* exchanges a token value within the total token value is illustrated in FIG. 15B. Hereinafter, with respect to the processing procedure illustrated in FIG. 15B, the symbol is assigned to the same processing procedure as that illustrated in FIG. 15A, and the description thereof will be omitted.

As illustrated in FIG. 15B, when the first total token value subjected to the addition of an additional token value is greater than the burst threshold value (Step S94: YES), the overrun state controller 63*a* determines, on the basis of the monitoring result supplied from the queue monitor 62, whether or not a packet is stored in the queue 23 (Step S96). In addition, when it is determined that no packet is stored in the queue 23 (Step S96: NO), the overrun state controller 63*a* updates the total token value to the burst threshold value (Step S96*a*), and the processing operation proceeds to Step S102.

On the other hand, when it is determined that a packet is stored in the queue 23 (Step S96: YES), the overrun state controller 63*a* compares the first total token value subjected to the addition of the additional token value with the memory upper limit token value (Step S98).

In addition, when the first total token value subjected to the addition is greater than the memory upper limit token value (Step S98: YES), the overrun state controller 63*a* updates the total token value to the memory upper limit token value (Step S98*a*), and the processing operation proceeds to Step S102.

As described above, the packet transmission device 20*a* according to the third embodiment includes the memory 300 into which the first memory 41 and the second memory 42 are integrated, and stores, within memory 300, a token value that overflows from the first memory 41 in the second memory 42. Therefore, in the same way as in the first embodiment, the packet transmission device 20*a* can suppress the decrease of the bandwidth, compared with a method of the related art, in which all the excess of a token value over the upper limit value of a memory is discarded. Furthermore, since, in the packet transmission device 20*a*, the first memory 41 and the second memory 42 are integrated into the memory 300, the device configuration thereof can be simplified.

Recommended Value of Burst Threshold Value

Finally, the recommended value of the burst threshold value in the present embodiment will be described. In the present embodiment, an additional token value is added to the first total token value with a predetermined period. The additional token value increases with an increase in a period during which the additional token value is added to the first total token value (referred to as "addition period", hereinafter). Namely, the additional token value is based on the addition period, and is calculated on the basis of the following expression.

$$\text{Additional Token Value} = \text{Output Bandwidth}/(1\ \text{sec}/\text{Addition Period}) \quad (1)$$

In addition, in the expression (1), the output bandwidth indicates the amount of packets output in one second.

In addition, when the additional token value obtained on the basis of the expression (1) noted above is consumed during a time period between a precedent addition period and a subsequent addition period, a packet that has a desired bandwidth can be output.

FIG. 16 is a diagram illustrating an output history of packets when the burst threshold value is equal to the additional token value. FIG. 16 includes a graphic chart 30 and a graphic chart 40. In the graphic chart 30, a horizontal axis indicates time, and a vertical axis indicates an output bandwidth. In the graphic chart 40, a horizontal axis indicates time, and a vertical axis indicates the first total token value. In the graphic chart 30 and the graphic chart 40, a condition is illustrated in which the burst threshold value is equal to the additional token value and a packet is output after the addition of the additional token value to the first total token value. As illustrated in the graphic chart 30 and the graphic chart 40, when at least the burst threshold value is equal to the additional token value, it turns out that packets for 1 Gbps, which corresponds to the desired bandwidth, can be output.

On the other hand, when the burst threshold value is less than the additional token value, the first total token value exceeds the burst threshold value every time the addition period comes. Therefore, it is difficult to output packets that have the desired band.

Figure 17:
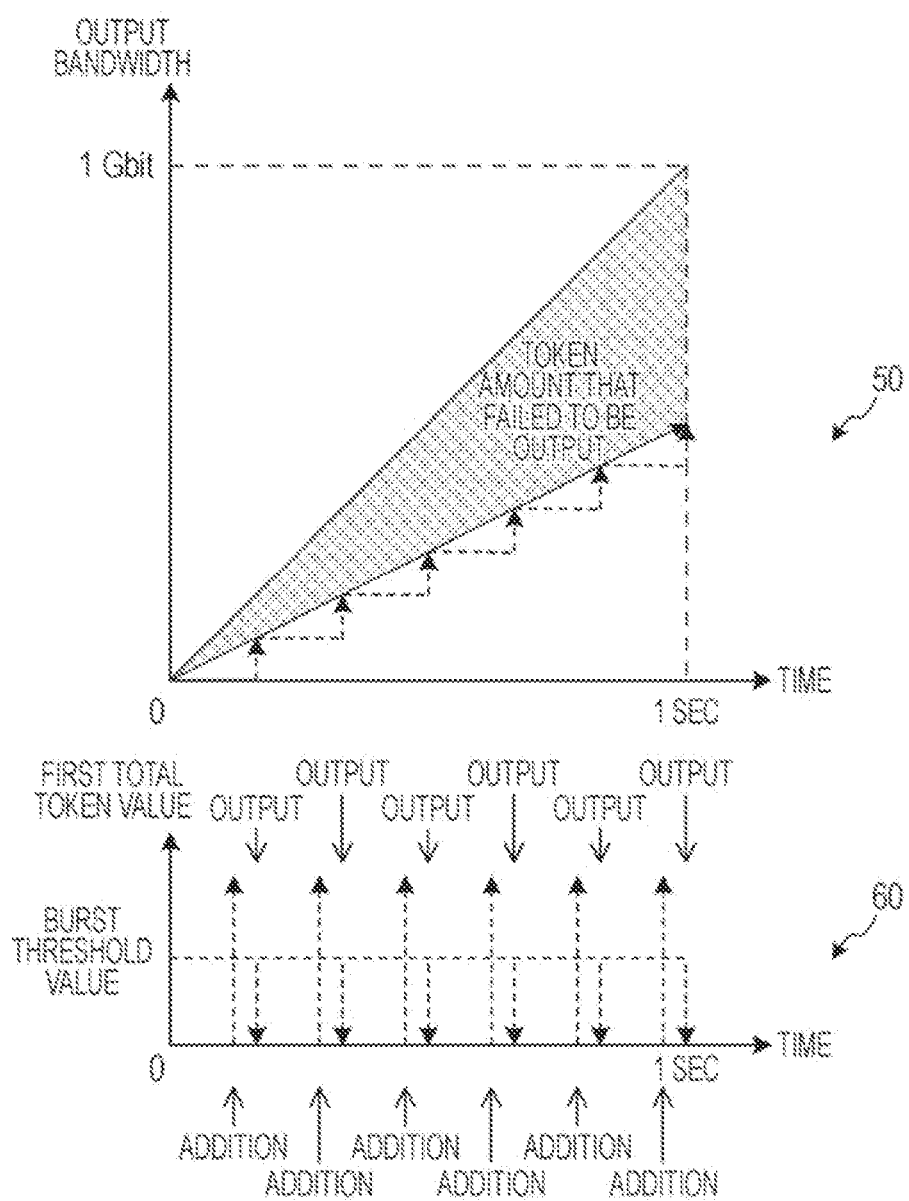
FIG. 17 is a diagram illustrating an output history of packets when the burst threshold value is less than the additional token value.

FIG. 17 is a diagram illustrating an output history of packets when the burst threshold value is less than the additional token value. FIG. 17 includes a graphic chart 50 and a graphic chart 60. In the graphic chart 50, a horizontal axis indicates time, and a vertical axis indicates an output bandwidth. In the graphic chart 60, a horizontal axis indicates time, and a vertical axis indicates the first total token value. In the graphic chart 50 and the graphic chart 60, a condition is illustrated in which the burst threshold value is less than the additional token value and a packet is output after the addition of the additional token value to the first total token value. As illustrated in the graphic chart 50 and the graphic chart 60, when the burst threshold value is less than the additional token value, it turns out that it is difficult to output packets for 1 Gbps, which corresponds to the desired bandwidth.

Accordingly, in order to output packets that have the desired bandwidth, it is necessary for the burst threshold value to be at least greater than or equal to the additional token value. However, when the burst threshold value is equal to the additional token value, a time elapsing before the output bandwidth that has been lost once recovers to the original value (referred to as "bandwidth recovery time", hereinafter) is lengthened. In addition, in the present embodiment, since a function for recovering token values that have overflowed is provided, the burst threshold value can be set to a minimal burst threshold value.

Figure 18:
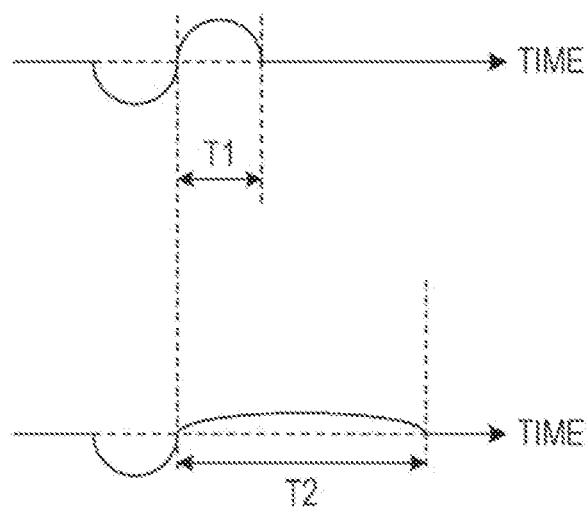
FIG. 18 is a diagram illustrating a relationship between the burst threshold value and a bandwidth recovery time.
Figure 19:
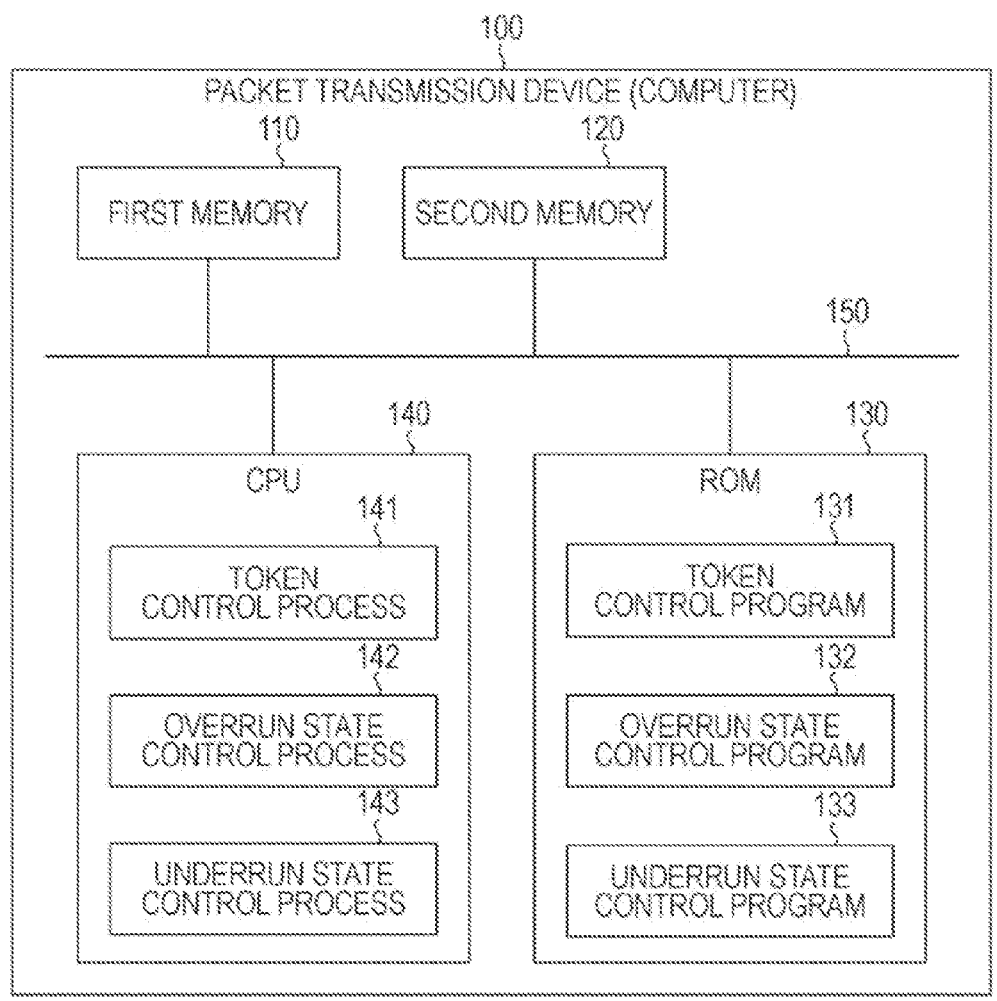
FIG. 19 is a diagram illustrating a computer that executes a packet transmission program.
Figure 20:
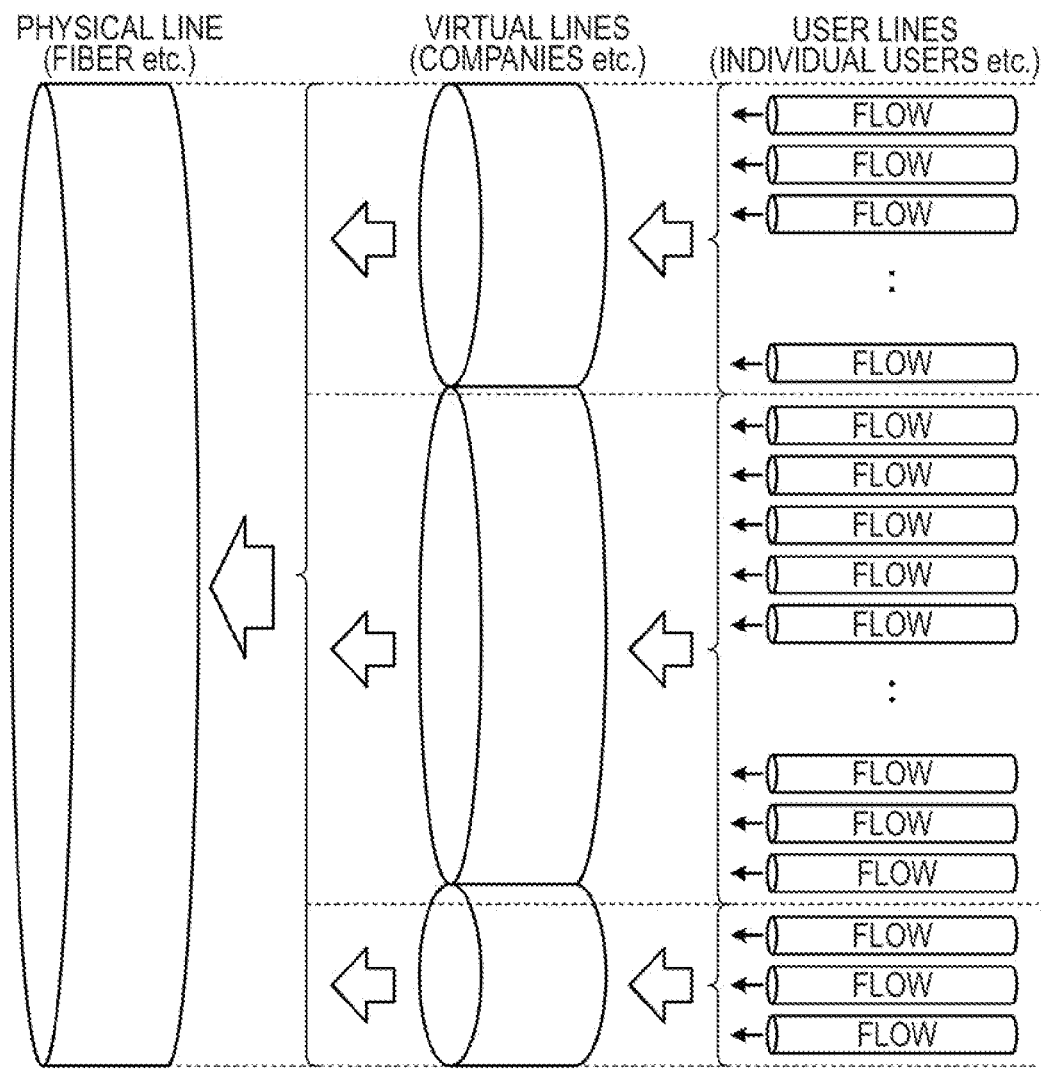
FIG. 20 is a diagram for explaining an example in which lines are contained in the packet transmission device.

FIG. 18 is a diagram illustrating a relationship between the burst threshold value and the bandwidth recovery time. In a lower figure in FIG. 18, it may be assumed that the burst threshold value is equal to the additional token value, and, in an upper figure in FIG. 18, it may be assumed that the burst threshold value is greater than the additional token value. As illustrated in FIG. 18, the bandwidth recovery time T1 for the burst threshold value greater than the additional token value is shorter than the bandwidth recovery time T2 for the burst threshold value equal to the additional token value.

In this way, when the burst threshold value is equal to the additional token value, the bandwidth recovery time is lengthened, compared with the case in which the burst threshold value is greater than the additional token value. Therefore, it is desirable to set the burst threshold value to a value greater than the additional token value, for example, a value that is 1.5 times the additional token value. In addition, here, while the recommended value of the burst threshold value has been described, it is also desirable to set the recommended value of the first upper limit token value in the second embodiment to a value greater than the additional token value, for example, a value that is 1.5 times the additional token value.

In addition, in the second embodiment, a burst amount is controlled in proportion to a normal bucket (the first memory 41). Therefore, it is desirable to set the standard token value and the second upper limit token value in the second embodiment to a value that is about 10 times the burst amount and a value that is equal to the additional token value, respectively. On the other hand, in the third embodiment, the burst amount is controlled in proportion to the burst threshold value. Therefore, it is desirable to set the upper limit token value in the third embodiment to a value that is about 10 times the burst amount, in the same way as in the second embodiment. The recommended values of the individual parameters are illustrated in the following table 1.

TABLE 1

| PARAMETER | SECOND EMBODIMENT | THIRD EMBODIMENT |
|---|---|---|
| ADDITIONAL TOKEN VALUE | OUTPUT BANDWIDTH/ (1 SEC/Token ADDITION PERIOD) | OUTPUT BANDWIDTH/ (1 SEC/Token ADDITION PERIOD) |
| UPPER LIMIT TOKEN VALUE | ADDITIONAL TOKEN VALUE × 1.5 | ABOUT 10 TIMES BURST AMOUNT |
| STANDARD TOKEN VALUE | ABOUT 10 TIMES BURST AMOUNT | |
| SECOND UPPER LIMIT TOKEN VALUE | SAME VALUE AS ADDITIONAL TOKEN VALUE | |
| BURST THRESHOLD VALUE | | ADDITIONAL TOKEN VALUE × 1.5 |

Fourth Embodiment

While the embodiments have been described as above, there are embodiments that may be implemented in various types of forms different from one another, in addition to the embodiments described as above. Therefore, another embodiment will be described hereinafter.

Addition Period of Token Value Subtracted from Second Total Token Value

In the second embodiment mentioned above, it is assumed that a token value, subtracted from the second total token value, is added to the first total token value, along with a token value added to the first total token value with a predetermined period. However, the disclosed technique is not limited to the example. For example, another addition period, different from the addition period of a token value added to the first total token value with a predetermined period, is provided, and a token value, subtracted from the second total token value, may be added to the first total token value with the different addition period.

Program

By the way, various kinds of functions described in the embodiments mentioned above may be realized by executing a prepared program in a computer. In addition, hereinafter, an example of a computer adapted to execute a program that has the same function as the embodiments mentioned above will be described. FIG. 12 is a diagram illustrating the computer that executes a packet transmission program.

As illustrated in FIG. 12, a computer 100 as a packet transmission device includes a first memory 110, a second memory 120, a read only memory (ROM) 130, and a central processing unit (CPU) 140. In addition, the first memory 110, the second memory 120, the ROM 130, and the CPU 140 are connected to one another using the bus 150.

The ROM 130 stores a packet transmission program that has the same function as the embodiments mentioned above, namely, a token control program 131, an overrun state control program 132, and an underrun state control program 133, as illustrated in FIG. 12. In addition, the individual programs 131 to 133 are not necessarily stored in the ROM 130.

The CPU 140 reads out the individual programs 131 to 133 from the ROM 130 and executes these programs 131 to 133. Accordingly, as illustrated in FIG. 12, the individual programs 131 to 133 function as a token control process 141, an overrun state control process 142, and an underrun state control process 143. In addition, the individual processes 141 to 143 correspond to the token controller 13, the overrun state controller 14, and the underrun state controller 15, illustrated in FIG. 1, respectively.

In addition, the first memory 110 and the second memory 120 correspond to the first storage module 11 and the second storage module 12, illustrated in FIG. 1, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A packet transmission device comprising:
    a first storage module and a second storage module configured to store a token value being information used to control an output of a packet;
    a token controller configured to add a predetermined token value with a predetermined period to a first total token value indicating a sum of token values stored in the first storage module, and subtract a predetermined token value from the first total token value in response to the output of the packet;
    an overrun state controller configured to add an excess of the first total token value over a predetermined upper limit value to a second total token value indicating a sum of token values stored in the second storage module, in the case where the first total token value added by addition control of the token controller is greater than or equal to the predetermined upper limit value; and
    an underrun state controller configured to subtract a predetermined token value from the second total token value and add the subtracted token value to the first total token value, in the case where the first total token value subtracted by subtraction control of the token controller is less than the predetermined upper limit value.

2. The packet transmission device according to claim 1, further comprising:
    a queue to store packets; and
    a queue monitor configured to monitor whether or not packets are stored in the queue,
    wherein the overrun state controller adds the excess of the first total token value over the predetermined upper limit value to the second total token value, in the case where the first total token value is greater than or equal to the predetermined upper limit value and the queue monitor determines that the packets are stored in the queue.

3. The packet transmission device according to claim 1, wherein the underrun state controller adds to the first total token value, a token value added with the predetermined period to the first total token value by the token controller and the token value subtracted from the second total token value.

4. The packet transmission device according to claim 1, wherein the underrun state controller subtracts a whole token value included in the second total token value from the second total token value in the case where the second total token value is less than a predetermined token value, and the underrun state controller subtracts a token value corresponding to the predetermined token value from the second total token value and adds the subtracted token value to the first total token value in the case where the second total token value is greater than or equal to the predetermined token value.

5. The packet transmission device according to claim 1, wherein the first storage module and the second storage module are included in an integrated storage module and the predetermined upper limit value stored in the first storage module is set as a maximum value of a packet amount that is transmitted to a facing device.

6. A packet transmission method of a packet transmission device comprising:
    adding, by a processor, a predetermined token value with a predetermined period to a first total token value indicating a sum of token values stored in a first storage module configured to store a token value being information used to control an output of a packet;
    subtracting a predetermined token value from the first total token value in response to the output of the packet;
    adding an excess of the first total token value over a predetermined upper limit value to a second total token value indicating a sum of token values stored in a second storage module, in the case where the first total token value added by addition control of the token controller is greater than or equal to the predetermined upper limit value; and
    subtracting a predetermined token value from the second total token value and adding the subtracted token value to the first total token value, in the case where the first total token value subtracted by subtraction of the token value is less than the predetermined upper limit value.

7. A packet transmission device comprising:
    a first memory and a second memory configured to store a token value being information used to control an output of a packet;
    a processor executing an operation, the operation including:
        adding a predetermined token value with a predetermined period to a first total token value indicating a sum of token values stored in the first memory,
        subtracting a predetermined token value from the first total token value in response to the output of the packet,
        adding an excess of the first total token value over a predetermined upper limit value to a second total token value indicating a sum of token values stored in the second memory, in the case where the first total token value added by addition control of the token controller is greater than or equal to the predetermined upper limit value, and subtracting a predetermined token value from the second total token value and adding the subtracted token value to the first total token value, in the case where the first total token value subtracted by subtraction of the token value is less than the predetermined upper limit value.

\* \* \* \* \*